(12) United States Patent
Machacek

(10) Patent No.: US 7,539,593 B2
(45) Date of Patent: May 26, 2009

(54) SELF-VALIDATED MEASUREMENT SYSTEMS

(75) Inventor: Milos Jaroslav Machacek, Reigate (GB)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 11/862,114

(22) Filed: Sep. 26, 2007

(65) Prior Publication Data

US 2008/0270162 A1 Oct. 30, 2008

Related U.S. Application Data

(60) Provisional application No. 60/914,561, filed on Apr. 27, 2007.

(51) Int. Cl.
*G01D 1/00* (2006.01)

(52) U.S. Cl. ............................................. 702/127

(58) Field of Classification Search ............... 702/45, 702/127, 179
See application file for complete search history.

(56) References Cited

U.S. PATENT DOCUMENTS

| | | | |
|---|---|---|---|
| 4,926,364 A | 5/1990 | Brotherton | |
| 5,570,300 A * | 10/1996 | Henry et al. | 702/45 |
| 5,586,066 A | 12/1996 | White et al. | |
| 5,680,409 A | 10/1997 | Qin et al. | |
| 5,774,378 A | 6/1998 | Yang | |
| 5,850,625 A | 12/1998 | Maren et al. | |
| 6,047,220 A | 4/2000 | Eryurek | |
| 6,580,046 B1 | 6/2003 | Koini et al. | |
| 6,772,082 B2 | 8/2004 | van der Geest et al. | |
| 6,816,810 B2 | 11/2004 | Henry et al. | |
| 7,107,176 B2 | 9/2006 | Henry et al. | |
| 2002/0042694 A1 | 4/2002 | Henry et al. | |
| 2003/0088381 A1 * | 5/2003 | Henry et al. | 702/127 |
| 2003/0167139 A1 | 9/2003 | Swartz et al. | |

FOREIGN PATENT DOCUMENTS

| | | |
|---|---|---|
| EP | 0827096 | 3/1998 |
| WO | WO 93/21505 | 10/1993 |
| WO | WO 00/10059 | 2/2000 |

OTHER PUBLICATIONS

M. P. Henry et al., "The Self-Validating Sensor: Rationale, Definitions and Examples," Control Engineering Practice, vol. 1, No. 4, pp. 585-610, 1993.

G. Wood, UK Activities in Measurement Validation and Data Quality, (Oct. 2000), Computing & Control Engineering Journal.

(Continued)

*Primary Examiner*—Drew A Dunn
*Assistant Examiner*—Stephen J Cherry
(74) *Attorney, Agent, or Firm*—Fish & Richardson P.C.

(57) ABSTRACT

Sensor data may be received from multiple sensors configured to sense properties of a process control system. The sensor data may include sensed values and uncertainty data corresponding to the sensed values. A new measurement associated with the process control system and corresponding uncertainty data for the new measurement may be determined based on the sensed values and uncertainty data received from the multiple sensors.

26 Claims, 6 Drawing Sheets

OTHER PUBLICATIONS

M. Henry, Plant Asset Management Via Intelligent Sensors Digital, Distributed and For Free, Oct. 2000, Computing & Control Engineering Journal.

M. P. Henry, The Integration of Fault Detection Within Plant-Wide Data Quality Management. vol. 2, Jun. 13-16, 1994, IFAC-Safeprocess 94.

U. Enste & F. Uecker, The Use of Supervisory Information in Process Control, (Oct. 2000), IEEE Computing & Control.

J. C. Yang & D. W. Clarke, The Self-Validating Actuator, vol. 7, pp. 249-260. (1999), Control Engineering Practice.

J. K. Hackett & M. Shah, Multi-Sensor Fusion: A Perspective, (1990), IEEE.

R. C. Luo & M. G. Kay, A Tutorial on Multisensor Integration and Fusion, (1990), IEEE.

M.P. Henry, "Self-Validating Sensor", Control Engineering Europe, pp. 32-39 (Jun. 2001).

M. Henry, Self-Validating Digital Coriolis Mass Flow Meter, (Oct. 2000), Computing & Control Engineering Journal.

S. J. Kline et al., "Describing Uncertainties in Single-Sample Experiments", Mechanical Engineering, pp. 3-8, 1953.

Paul M. Frank, "Fault Diagnosis in Dynamic Systems Using Analytical and Knowledge-based Redundancy—A Survey and Some New Results," Automatica, vol. 26, No. 3, pp. 459-474, 1990.

R. J. Moffat, "Contributions to the Theory of Single-Sample Uncertainty Analysis", ASME Journal of Fluid Engineering, vol. 104, pp. 250-260, 1982.

M. P. Henry, "A SEVA Sensor—The Coriolis Mass Flow Meter," IFAC Fault Detection, Supervision and Safety for Technical Processes, vol. 2, pp. 429-434, 1994.

Kresta et al., "Multivariate Statistical Monitoring of Process Operating Performance", Chemical Engineering Dept., McMaster Univ. Ontario, vol. 69, Feb. 1991, pp. 35-47.

MacGregor et al., "Statistical Process Control of Multivariate Processes", Chemical Engineering Dept., McMaster Advanced Control Consortium, McMaster Univ. vol. 3, No. 3, 1995, pp. 403-414.

Declaration of Milos Jaroslav Machacek, dated Jan. 29, 2009.

* cited by examiner

US 7,539,593 B2

SELF-VALIDATED MEASUREMENT SYSTEMS

CROSS-REFERENCE TO RELATED APPLICATIONS

The present application claims priority to U.S. Provisional Application No. 60/914,561, filed Apr. 27, 2007, which is incorporated herein by reference in its entirety.

TECHNICAL FIELD

This disclosure relates to measurement systems.

BACKGROUND

The industrial process control field applies to factory automation, process control applications, and other types of automated industrial systems. In implementing an industrial process control system, industrial field devices adjust, set, control, and/or report field process variables. For example, control of an industrial process (e.g., a company producing chemicals, minerals, food, or beverages) includes measurement of process variables, such as pressure, temperature, level, and flow, and exchange of process information between field devices and controllers in the system. At the field level, sensors are installed in tanks, vessels, pipelines, and other areas that make up the processing plant and provide process variable (e.g., temperature, pressure, level, flow, etc.) signals to controllers included in the system. Sensors may provide sensor data to controllers or other industrial field devices over a communication media which could be either a point-to-point connection or multi-point connections (e.g., fieldbus).

SUMMARY

In one general aspect, a first sensed value corresponding to a first property of an industrial process is received from a first sensor and a second sensed value corresponding to a second property of the industrial process is received from a second sensor. First uncertainty data associated with the first sensed value is received from the first sensor and second uncertainty data associated with the second sensed value is received from the second sensor. Based on the first sensed value, the first uncertainty data, the second sensed value, and the second uncertainty data, a measurement and corresponding uncertainty data for the measurement are determined for the industrial process.

Implementations may include one or more of the following features. For example, model-based data representing the industrial process for which the measurement is being determined may be accessed and the measurement and uncertainty data may be computed based on the accessed model-based data representing the industrial process for which the measurement is being determined. The second sensed value may correspond to a second property of an industrial process that is different than the first property of the industrial process and the measurement and uncertainty data may be computed by applying the first sensed value and second sensed value to a theoretical model representing the industrial process.

In some implementations, a determination may be made that the second sensor is malfunctioning based on the second sensed value and the second uncertainty data. In these implementations, model-based data representing the industrial process may be accessed, an estimated value for the second property may be determined based on the accessed model-based data, and uncertainty data associated with the estimated value for the second property may be determined based on the accessed model-based data. Based on the estimated value for the second property and the uncertainty data associated with the estimated value for the second property, the measurement and corresponding uncertainty data for the measurement may be determined for the industrial process.

Historical information associated with the industrial process may be accessed and the measurement and corresponding uncertainty data for the measurement may be determined for the industrial process based on the accessed historical information. The historical data accessed may include past values sensed by the first sensor and the second sensor during operation of the industrial process. In some examples, a determination may be made that the second sensor is malfunctioning based on the second sensed value and the second uncertainty data. In these examples, an estimated value for the second property may be determined based on the accessed historical information and uncertainty data associated with the estimated value for the second property may be determined based on the estimated value for the second property and the uncertainty data associated with the estimated value for the second property, the measurement and corresponding uncertainty data for the measurement may be determined for the industrial process, based on the estimated value for the second property and the uncertainty data associated with the estimated value for the second property.

In some implementations, data indicating an accuracy statistic associated with the first sensed value may be received from the first sensor and an accuracy statistic associated with the second sensed value may be received from the second sensor. A measurement and corresponding accuracy statistic for the measurement may be determined based on the accuracy statistic associated with the first sensed value and the accuracy statistic associated with the second sensed value. In some examples, the first sensed value corresponding to the first property of the industrial process may be related to the second sensed value corresponding to the second property of the industrial process. In this example, an accuracy statistic for the measurement indicating that the measurement is more accurate than the first sensed value and the second sensed value may be determined.

Model-based data representing the industrial process may be accessed and the accuracy statistic associated with the first sensed value and the accuracy statistic associated with the second sensed value may be adjusted based on the model-based data. An accuracy statistic for the measurement may be determined based on the adjusted accuracy statistic associated with the first sensed value and the adjusted accuracy statistic associated with the second sensed value. A value for at least one property that influences the accuracy of the first sensor may be determined and the accuracy statistic associated with the first sensed value may be determined based on the value for at least one property that influences the accuracy of the first sensor and the model-based data.

Data indicating an operating status of the first sensor and data indicating an operating status of the second sensor may be received. A measurement and corresponding data indicating an operating status of the resulting measurement of the industrial process may be determined based on the operating status of the first sensor and the operating status of the second sensor. Data indicating whether the first sensor is operating correctly, is partially operating correctly, or is not operating correctly and data indicating whether the second sensor is operating correctly, is partially operating correctly, or is not operating correctly may be received. A determination may be made as to whether the resulting measurement of the industrial process is operating correctly, is partially operating correctly, or is not operating correctly based on the data indicating whether the first sensor is operating correctly, is partially operating correctly, or is not operating correctly and the data indicating whether the second sensor is operating correctly, is partially operating correctly, or is not operating correctly.

In some implementations, model-based data representing the industrial process may be accessed, historical information associated with the industrial process may be accessed, and the first sensed value and the second sensed value may be validated based on the accessed model-based data and the accessed historical information. Operation of the industrial process may be controlled based on the determined measurement and corresponding uncertainty data. For instance, in the event of a fault condition, availability of the industrial process may be maintained by reducing a required accuracy for a current operating range or reducing the current operating range. A sensed value corresponding to one of a temperature, a pressure, a level, or a totalized flow quantity of liquid in a custody transfer process may be received from one of a temperature sensor, a pressure sensor, a level sensor, or a flow meter.

In another general aspect, first sensor data generated by multiple sensors associated with a first subsystem included in an industrial process control system is received. The first sensor data includes, from each of the multiple sensors associated with the first subsystem, a sensed value and uncertainty data associated with the sensed value. A first subsystem measurement is determined based on the received first sensor data and first uncertainty data associated with the first subsystem measurement is determined based on the received first sensor data. Second sensor data generated by multiple sensors associated with a second subsystem included in the industrial process control system is received. The second subsystem is different from the first subsystem and the second sensor data includes, from each of the multiple sensors associated with the second subsystem, a sensed value and uncertainty data associated with the sensed value. A second subsystem measurement is determined based on the received second sensor data and second uncertainty data associated with the second subsystem measurement is determined based on the received second sensor data. The first subsystem measurement, the first uncertainty data associated with the first subsystem measurement, the second subsystem measurement, and the second uncertainty data associated with the second subsystem measurement are accessed. Based on the accessed first subsystem measurement, the accessed first uncertainty data associated with the first subsystem measurement, the accessed second subsystem measurement, and the accessed second uncertainty data associated with the second subsystem measurement, operating conditions of the industrial process control system are determined.

Implementations may include one or more of the following features. For example, discrepancies may be detected between the accessed first subsystem measurement and the accessed second subsystem measurement. An availability measurement for the industrial process control system may be determined. A measurement value for the industrial process control system and corresponding uncertainty data for the measurement value for the industrial process control system may be determined. The uncertainty data for the measurement may reflect propagated uncertainty data associated with the multiple sensors associated with the first subsystem and the multiple sensors associated with the second subsystem.

In some implementations, model-based data representing a process performed by the first subsystem may be accessed, historical information associated with the process performed by the first subsystem may be accessed, and the first subsystem measurement may be determined based on the model-based data and the historical information. In these implementations, a determination may be made that at least one of the multiple sensors associated with the first subsystem is malfunctioning and a value for the at least one malfunctioning sensor may be estimated based on the model-based data and the historical information. The first subsystem measurement may be determined based on the estimated value for the at least one malfunctioning sensor.

Implementations of the described techniques may include hardware, a method or process, or computer software on a computer-accessible medium. The details of one or more implementations are set forth in the accompanying drawings and the description below. Other features will be apparent from the description and drawings.

DETAILED DESCRIPTION

Figure 1:
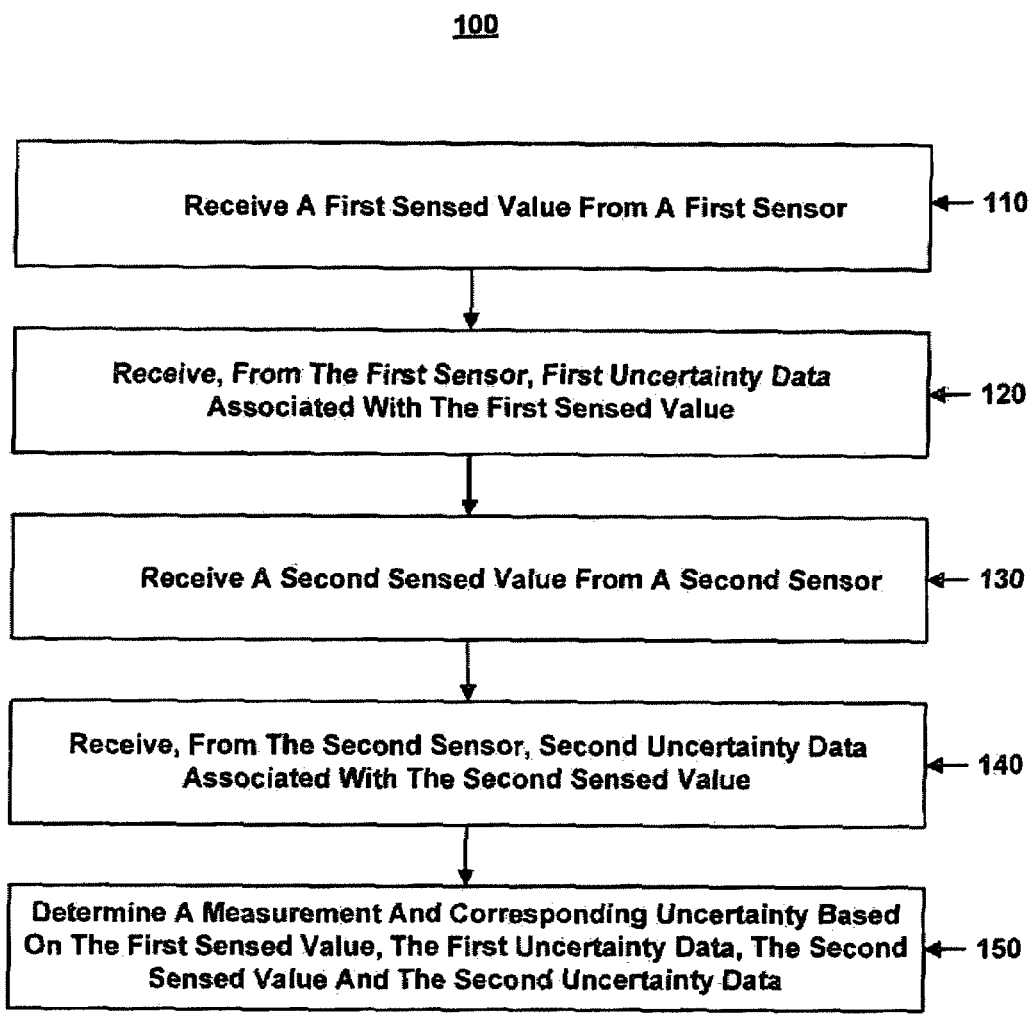
FIG. 1 is a flow chart illustrating an example of a process for combining measurements and uncertainty values associated with the measurements.

Measurement systems may be based on self-validated primary elements (e.g., sensors and actuators) where additional information may be produced by the primary elements and used to improve properties of such systems. For example, self-validation (SEVA) concepts may be applied to instruments or systems for measurement and control where system variables may include quality indicators. The quality indicators may include an uncertainty value associated with the variable, a status of the measured variable, and a diagnostic status of the device measuring the variable. A measurement system may use the quality indicators associated with measured variables to determine properties of the system and control the system based on the properties.

In some implementations, self-validated systems may be hierarchical. For instance, primary sources (e.g., sensors) may be validated by their manufacturers, based on knowledge of their design, manufacturing processes, factory calibration, and predictions for operation under normal and abnormal conditions, regardless of the application in which the primary sources will be used. Measurement subsystems and systems may use the additional information provided by the primary sources (e.g., sensors) and update or add to the additional information using model-based validation information derived from the knowledge of particular applications in which the primary sources are used.

In addition, measurement subsystems and systems may combine inputs from several measurement instruments (e.g., sensors) and/or actuators and produce other variables for their outputs. For example, a particular measurement subsystem or system (e.g., a multi-sensor tank-gauge, a multi-variable flow meter, a control loop with multiple sensors and/or actuators, etc.) may receive sensed values and corresponding uncertainty values from multiple sensors associated with the measurement subsystem or system. In response to receiving the sensed values and corresponding uncertainty values, the particular measurement subsystem or system may analyze the received information and determine a subsystem or system measurement and a corresponding uncertainty value for the subsystem or system measurement based on the analysis.

In one implementation, a particular measurement subsystem or system may include multiple sensors that redundantly measure a particular value (e.g., two temperature sensors that measure temperature at the same location) or measure related values (e.g., temperature at two different, but nearby locations; level measured in the same tank by a level gauge and by a hydrostatic gauge). In this example, the particular measurement subsystem or system may receive a sensed value and an uncertainty value associated with the sensed value from each of the multiple sensors. In response to receiving the sensor data, the particular measurement subsystem or system may determine a subsystem or system measurement and may determine an uncertainty value associated with that measurement (e.g., a temperature or level value for the subsystem or system and an uncertainty value associated with that temperature or level value). Because the particular measurement subsystem of system determined the subsystem or system measurement and corresponding uncertainty value based on sensor data from related sensors, the uncertainty value for the subsystem or system measurement may be lower (e.g., the measurement is more accurate or certain). The subsystem or system measurement may be propagated to other subsystems, systems, or controllers and used to control the subsystem or system.

In some arrangements, the measurement subsystem or system may take model-based calculations or historical data into account in determining a subsystem or system measurement and corresponding uncertainty. By taking model-based calculations or historical data into account, the subsystem or system measurement may have a lower uncertainty (e.g., the measurement is more accurate or certain) or the measurement subsystem or system may continue operation, albeit with a greater level of uncertainty, in the event that a sensor malfunctions. In the event of sensor malfunction, the subsystem or system may remain available or in operation with the uncertainty value associated with the subsystem or system measurement reflecting the increased level of uncertainty resulting from loss of the sensor. Limp-home scenarios may take a higher uncertainty value into account and may be used to keep a system alive or in operation at reduced performance.

Self-validated systems, where uncertainties and statuses of measurements may be computed on-line, in real-time, may add value to a number of applications where accuracy and system availability are of importance. In particular, industrial process control systems (e.g., chemical processing systems, brewing or fermentation control systems, food retailing systems, tank systems, etc.) may benefit from the increased accuracy and availability. Other systems (e.g., geographical information systems, economic or financial systems, etc.) may also benefit from the increased accuracy and availability.

FIG. 1 illustrates an example of a process 100 for determining a measurement and an uncertainty value associated with the measurement. The operations in flow chart 100 are described generally as being performed by a higher-level subsystem. In some implementations, the subsystem may be included in an industrial process control device or system and may be configured to control an industrial process. The operations of flow chart 100 may be performed by a processor, a computer, or another type of electronic device. In some examples, the operations of process 100 may be performed by multiple subsystems or systems included in one or more electronic devices or systems.

The subsystem receives a first sensed value from a first sensor (110). For example, the subsystem may receive the sensed value from the sensor via an electronic communication. The electronic communication may include information related to a measurement value for a physical or other property measured by the sensor. The physical or other property may be associated with an industrial process and the measurement value may reflect a current state of the industrial process. For instance, the sensor may be a temperature sensor, a pressure sensor, a level sensor, a flow meter, or any other type of sensor that measures a physical or other condition and the sensed value may be a measurement corresponding to the type of sensor (e.g., a temperature measurement, a pressure measurement, a level measurement, a flow measurement, etc.).

The subsystem may receive the sensed value from the sensor over any type of wired or wireless connection. In some implementations, the subsystem may receive the sensed value from the sensor over a dedicated wired connection from the sensor. In these implementations, the subsystem may be positioned near or proximate to the location of the sensor that sensed the value.

In other implementations, the subsystem may receive the sensed value over any type of network connection. For example, the subsystem may receive the sensed value over a fieldbus that facilitates communications between devices included in an industrial process control system. In these implementations, the subsystem may be positioned far away from the sensor that sensed the value.

The subsystem receives, from the first sensor, first validation data associated with the first sensed value (120). For example, the subsystem may receive the validation data from the sensor in an electronic communication over a wired or wireless connection or network. The subsystem may receive the validation data contemporaneously with the sensed value. For instance, the subsystem may receive, from the sensor, the validation data in one or more electronic communications that also include the sensed value. The subsystem also may receive the validation data separate from and at a different time than the sensed value.

The validation data may include information associated with the accuracy of the sensed value (or its uncertainty), information associated with the status of the sensed value, and information associated with the diagnostic status of the sensor. For instance, the sensor may have been validated by the manufacturer of the sensor based on the design process of the sensor, the manufacturing process of the sensor, factory calibration of the sensor, and predictions for operation of the sensor. Based on the validation information, the sensor may include data associated with the accuracy (uncertainty) of the values sensed by the sensor and the sensor may determine uncertainty values for the currently sensed value based on the data. The sensor may dynamically determine uncertainty data based on the conditions associated with the sensor sensing the current value or the sensor may provide a static uncertainty value. The validation data used by the sensor to determine the uncertainty data may be set by the manufacturer and may not account for the application in which the sensor is used. In other examples, the data used by the sensor to determine the uncertainty data may be updated or adjusted based on the application in which the sensor is used.

The validation data also may account for or include information associated with the status of the sensor. For example, the validation data may account for or include information associated with whether the sensor is functioning properly, whether the sensor is being used in conditions or ranges for which the sensor was designed, and the age or usage of the sensor. For instance, the validation data may include information related to whether the sensed value is perceived as clear, blurred, or blind. The sensor may indicate that the sensed value is clear when the sensor is in good working order, operating in preferred design ranges, and being used in a process for which the sensor was designed. The sensor may indicate that the sensed value is blurred when the sensor is partly damaged, operating outside of its design ranges, operating in a process for which the sensor was not designed, or subject to aberrations or partial degradation of its functions. The sensor may indicate that the sensor is blind when the sensor has failed or lost connection to the process the sensor is monitoring. When the sensor is blind, its output may be based on historical records. The validation data may include other types of status information and information reflecting more or fewer states of the sensor.

The subsystem receives a second sensed value from a second sensor (130). For example, the subsystem may receive a second sensed value from a second sensor using techniques similar to those described above with respect to the subsystem receiving a first sensed value from a first sensor (110). The second sensor is a different sensor than the first sensor, but may measure a physical or other property that is related to the physical property measured by the first sensor. For instance, the second sensor may be a same type of sensor as the first sensor and may be positioned proximate to the first sensor. In some arrangements, both the first sensor and the second sensor are temperature sensors located in generally the same area. In these arrangements, the first sensor and the second sensor provide two measurements for a single quantity such that both sensed values may be analyzed to increase the accuracy and reliability of the temperature measurement.

In other arrangements, the second sensor may be a different type of sensor than the first sensor. For example, the second sensor may be a pressure sensor and the first sensor may be a liquid level sensor. In this example, the two sensed values may be analyzed to arrive at another type of measurement or may be used to verify or increase the accuracy for one of the two sensed values. For instance, the sensed value of pressure may be used to verify the sensed value of liquid level because a particular level of liquid in a tank may result in a corresponding expected pressure and the sensed value for pressure may be compared to the expected value.

The subsystem receives, from the second sensor, second validation data associated with the second sensed value (140). For example, the subsystem may receive, from the second sensor, second validation data associated with the second sensed value using techniques similar to those described above with respect to the subsystem receiving, from the first sensor, first validation data associated with the first sensed value (120). The second validation data may include the same type of validation data as the first validation data or may be different than the first validation data.

The subsystem determines a measurement and corresponding uncertainty data for the measurement based on the first sensed value, the first validation data, the second sensed value, and the second validation data (150). For example, the subsystem may analyze the first sensed value, the first uncertainty data, the second sensed value, and the second uncertainty data and calculate a new measurement and new uncertainty data for the new measurement. The new measurement may be the same type of measurement as both the first sensed value and the second sensed value, may be the same type of measurement as one of the first sensed value and the second sensed value, or may a type of measurement different than the first sensed value and the second sensed value. The subsystem may account for the first and second sensed values and the first and second uncertainty data in calculating the new measurement and new uncertainty value. The new measurement may be a subsystem or system measurement that reflects a more general property for the subsystem or system than the physical or other properties measured by the sensors.

In some implementations, in calculating the new measurement, the subsystem may weight the first sensed value more than the second sensed value if the uncertainty data indicates that the first sensed value is more accurate than the second sensed value. In these implementations, the subsystem may analyze the accuracy of the first measurement and the accuracy of the second measurement to calculate an accuracy of the new measurement to include in the uncertainty data associated with the new measurement. The accuracy of the new measurement may be greater than the accuracy of the first sensed value and the second sensed value.

In some examples, the validation data for the first sensed value may indicate that the first sensor in not functioning properly (e.g., the first sensed value is blind). In these examples, the subsystem may disregard the first sensed value and only use the second sensed value in calculating the new measurement. For instance, when the new measurement is the same type of measurement as the second sensed value; the subsystem may use the second sensed value and second uncertainty data as the hew measurement and corresponding uncertainty because the first sensed value is known to be invalid. Using the second sensed value as the new measurement, may result in less accuracy than normal operation, but may allow a system to continue operation while waiting for the first sensor to be replaced or repaired.

In further implementations, model-based data and calculations may be used to determine the new measurement. For example, the subsystem may access model-based data for the particular application in which the first sensor and second sensor are being used and use the model-based data to generate a new measurement or make adjustments to the sensed values to account for properties known about the particular application. The model-based data and calculations may represent knowledge derived from particular applications in which the sensors are being used. For instance, the model-based data and calculations may account for specific aspects of a particular process in which the sensors are being used and the subsystem may tailor a manufacturer's general calibration or accuracy data for the sensors to the particular process to better reflect the actual accuracy data of the sensors when the sensors are used in the particular process. In some examples, the model-based data and calculations also may include one or more equations with variables corresponding to the first sensed value, the first uncertainty data, the second sensed value, and the second uncertainty data that model the process in which the sensors are being used. In these examples, the subsystem may use the equations to compute a new measurement value and corresponding uncertainty data for the new measurement value based on the first sensed value, the first uncertainty data, the second sensed value, and the second uncertainty data.

In some implementations, the subsystem may receive more than two (and perhaps many more) sensed values and corresponding uncertainty data for the sensed values. In addition, the subsystem may determine one or more measurements based on the sensed values and corresponding uncertainty data using different combinations of the received sensed values.

Figure 2:
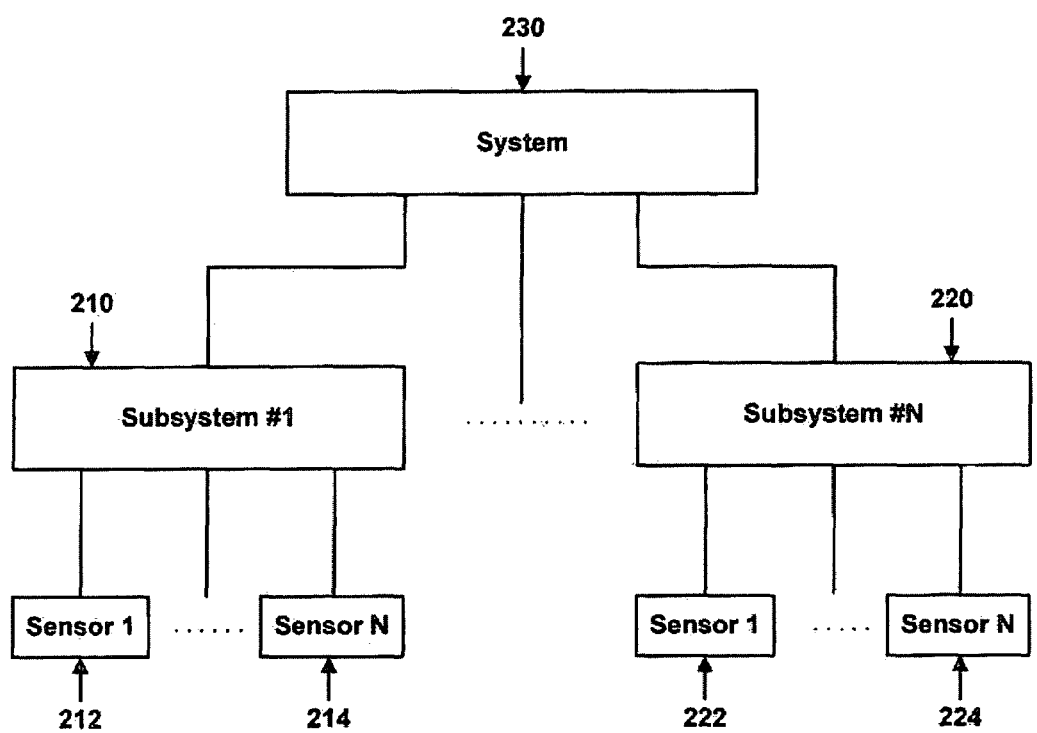
FIG. 2 is a block diagram illustrating an example of an industrial process control system with a layered structure.

FIG. 2 illustrates an example of an industrial process control system 200. The industrial process control system 200 may implement the process 100 described above with respect to FIG. 1. The industrial process control system 200 includes a system 230 and multiple subsystems 210 and 220. Each of the multiple subsystems 210 and 220 include multiple sensors 212 and 214 and 222 and 224, respectively.

The multiple subsystems 210 and 220 may be subsystems included in the system 230. Each of the subsystems 210 and 220 may represent one or more physical components that are used in performing operations of the system 230. The performance of the system 230 may be achieved by the combined operation of the subsystems 210 and 220 with each of the subsystems performing a specific operation. The subsystems 210 and 220 may be the same type of subsystem (e.g., subsystems that perform the same operation, but with different materials or at a different stage of a process) or the subsystems 210 and 220 may be different types of subsystems (e.g., subsystems that perform different operations or perform a similar operation using different techniques).

For example, the system 230 may control or monitor a tank farm. In this example, the subsystem 210 may represent a tank or tank-gauge included in the tank farm and the subsystem 220 may represent a flow meter included in the tank farm. The system 230 also may be a chemical plant and the subsystems 210 and 220 may be chemical reactors included in the chemical plant. In another configuration, the system 230 may be an oil refinery and the subsystems 210 and 220 may be oil distillation columns included in the oil refinery.

The subsystem 210 may include one or more sensors (or other electronic components) that control and monitor the operations of the subsystems 210. The one or more subsystems may receive input from multiple sensors 212 and 214 and combine the inputs to produce other variables related to operating properties of the subsystem 210. The subsystem 210 also may receive uncertainty data from multiple sensor 212 and 214 and produce uncertainty data for the process performed by the subsystem 210 based on the uncertainty data of the multiple sensors 212 and 214.

In some arrangements, the subsystem 210 may include an input/output interface that enables the subsystem to send and receive variables, sensor data, uncertainty data, or other information related to the subsystem 210 operations to and from the system 230 and the multiple sensors 212 and 214. The subsystem 210 may send data to the system 230 and the multiple sensors 212 and 214 over a direct connection or over a network, such as a fieldbus. In some implementations, the subsystem 210 may include a display and/or user input controls (e.g., control button, a keyboard, a mouse, etc.) with which an operator may perceive the status of the subsystem 210 and/or control operation of the subsystem 210. The subsystem 210 further may include electronic storage (e.g., disk memory, random access memory (RAM), read only memory (ROM), etc.) in which the subsystem 210 may store historical data, model-based data and calculations, or any other information used in monitoring and controlling operation of the subsystem 210.

The subsystem 220 may include electronic components or other electronic circuitry similar to that described above with respect to the subsystem 210. The subsystems 210 and 220 also may be able to send electronic communications to each other, receive sensor data from sensors common to each other, and send communications to the system 230 using the same or different networks or communication links.

The sensors 212, 214, 222, and 224 may be any type of sensor configured to sense or measure a physical or other property associated with operations of a subsystem. For instance, the sensors 212, 214, 222, and 224 may include one or more of a temperature sensor, a pressure sensor, a level sensor, a flow meter, or any other type of sensor that measures a physical or other condition. The sensors 212, 214, 222, and 224 may include communication components configured to communicate sensor data to the subsystems 210 and 220 over a wired or a wireless communication pathway. The sensors 212, 214, 222, and 224 may communicate sensor data or other information over a dedicated connection to a subsystem or over a network connection.

In some implementations, the sensors 212, 214, 222, and 224 include controllers or other processing circuitry with which the sensors 212, 214, 222, and 224 may compute uncertainty data associated with sensed values or measurements made by the sensors 212, 214, 222, and 224. The uncertainty data may relate to the accuracy of the measurements and/or the current operating status of the sensors 212, 214, 222, and 224. The sensors 212, 214, 222, and 224 also may include electronic storage in which the sensors 212, 214, 222, and 224 may store calibration, validation, or other data that the sensors 212, 214, 222, and 224 use to compute uncertainty data. In some examples, the sensors 212, 214, 222, and 224 may have additional sensing capabilities or may receive data from other sensors and use the additional data to compute uncertainty data. For instance, a pressure sensor may receive or sense a current temperature to determine whether the pressure sensor is operating in a preferred temperature operating range of whether the sensor is operating outside of the preferred operating range. The pressure sensor may use the temperature data to influence the uncertainty data associated with the pressure sensed by the pressure sensor.

Similar to subsystems 210 and 220, the system 230 may include one or more controllers (or other electronic components) that control and monitor the operations of the system 230. The one or more controllers may receive input from multiple subsystems 210 and 220 and combine the inputs to produce other variables related to operating properties of the system 230. The system 230 also may receive uncertainty data from multiple subsystems 210 and 220 and produce uncertainty data for one or more processes performed by the system 230 based on the uncertainty data of the multiple subsystems 210 and 220. By using the measurements and uncertainty data determined by the multiple subsystems 210 and 220, the uncertainty data associated with the lowest level sensors (e.g., sensors 212, 214, 222, and 224) may be combined and propagated to the system level. By the subsystems 210 and 220 combining the sensor data to produce new measurements and uncertainties, the control circuitry of the system 230 may be less complex because the system 230 may receive less input variables and may perform calculations based on the lesser number of input variables.

In some arrangements, the system 230 may include an input/output interface that enables the subsystem to send and receive variables, sensor data, uncertainty data, control data, or other information related to the system 230 operations to and from the multiple subsystems 210 and 220. The system 230 may send data to the subsystems 210 and 220 over a direct connection or over a network, such as a fieldbus. For example, the system 230 may send control data to the subsystems 210 and 220 over a fieldbus based on operating properties associated with the system 230 determined by the system 230 based on the subsystem measurements and uncertainties.

In some implementations, the system 230 may send diagnostic reports or warnings to other devices based on the current operating properties of the system. In these implementations, the system 230 may send the diagnostic reports or warnings using any type of communication medium (e.g., electronic mail, telephone call, instant message, text message, pager alert, etc.). For instance, in the event the system 230 detects an error in system performance, the system 230 may send a pager alert to an operator of the system. The diagnostic report or warning may be specific to a particular subsystem included in the system 230.

In further implementations, the system 230 may include a display and/or user input controls (e.g., control button, a keyboard, a mouse, etc.) with which an operator may perceive the status of the system 230 and/or control operation of the system 230. The system 230 further may include electronic storage (e.g., disk memory, random access memory (RAM), read only memory (ROM), etc.) in which the system 230 may store historical data, model-based data and calculations, or any other information used in monitoring and controlling operation of the system 230.

The system 230 may include any number of subsystems and each of the subsystems may include any number of sensors. In addition, the system 230 may receive sensor data directly from sensors associated with the system 230 or may receive sensor data directly from a subsystem without processing of the sensor data by the subsystem. The system 230 also may communicate with other systems and may send information related to system properties and uncertainty data corresponding to those system properties to other systems or other devices.

Figure 3:
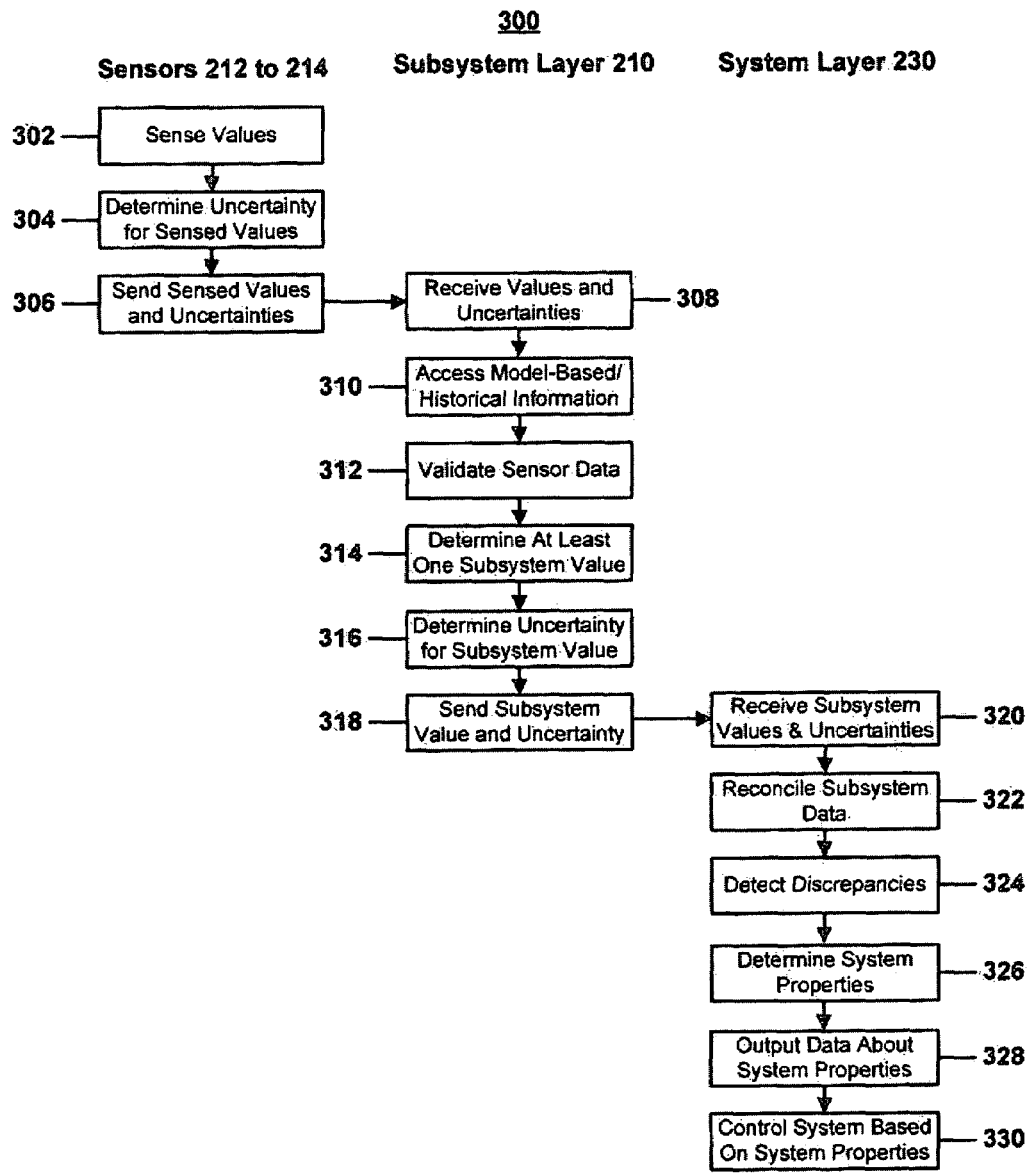
FIG. 3 is a flow chart illustrating an example of a process for propagating system properties of the industrial process control system shown in FIG. 2.

FIG. 3 illustrates an example of a process 300 for determining system properties of the industrial process control system shown in FIG. 2. For convenience, particular components described with respect to FIG. 2 are referenced as performing the process 300. However, similar methodologies may be applied in other implementations where different components are used to define the structure of the system, or where the functionality is distributed differently among the components.

The sensors 212 to 214 sense values (302) and determine uncertainty data for the sensed values (304). For example, the sensors 212 to 214 sense a physical property (e.g., temperature, pressure, etc.) associated with a process being performed by the subsystem 210 and determine uncertainty data for the sensed values. The sensors 212 to 214 may determine uncertainty data based on information related to the manufacture of the sensors 212 to 214, manufacturer calibration or testing data for the sensors 212 to 214, the current operating range in which the sensors 212 to 214 are being used, and whether the sensors 212 to 214 are functioning properly.

The sensors 212 to 214 send the sensed values and uncertainty data to the subsystem 210 (306). For example, the sensors 212 to 214 send the sensed values and uncertainty data to the subsystem 210 in electronic communications over a wired or wireless communication pathway. The sensors 212 to 214 may send the sensed values and uncertainty data to the subsystem 210 over a dedicated connection or over a network connection.

The subsystem 210 receives the sensed values and uncertainty data from the sensors 212 to 214 (308). For example, the subsystem 210 receives the sensed values and uncertainty data in electronic communications over a network of dedicated communication pathway. The subsystem 210 may extract the sensed values and uncertainty data from the electronic communications and may convert the sensed values or uncertainty data to a format used by the subsystem 210. The subsystem 210 also may extract identification data from the electronic communications to associate the sensed values and uncertainty data with the sensor that produced the sensed values and uncertainty data.

The subsystem 210 accesses model-based data and historical information (310). For instance, the subsystem 210 may access the model-based data and historical information by receiving the model-based data and historical information in electronic communications over a network or other communication medium. The subsystem 210 also may access the model-based data and historical information from electronic storage associated with the subsystem 210. The model-based data and historical information may be used by the subsystem 210 in processing the sensed values and uncertainty data and may improve the effectiveness with which the subsystem 210 computes subsystem measurements. The model-based data and historical information also may enable the subsystem to maintain operation in the event of sensor malfunction or degradation.

The model-based data may include data related to modeling a process being performed by the subsystem 210. For example, the model-based data may include equations that model the process performed by the subsystem 210 or may include theoretical data related to anticipated properties associated with the process performed by the subsystem 210.

The historical information may include information related to past operation and sensed values for the process performed by the subsystem 210. For instance, the historical information may include past sensed values and uncertainties that have occurred during operation of the process performed by the subsystem 210. The historical information may include information associated with the subsystem 210 actually performing the process and/or may include information associated with other subsystems performing a similar process. The historical information may include raw data associated with the process or processed data. In some examples, the historical information includes statistical data computed based on the sensed values and uncertainty, data obtained for the process performed by the subsystem 210.

The subsystem 210 validates the sensor data (312). For example, the subsystem 210 may compare the values received from the multiple sensors 212 to 214 to the model-based data and historical information to determine whether the sensed values are in accordance with anticipated or past results. The subsystem 210 also may compare the sensed values to each other to determine whether one or more of the values are inconsistent with the others. The model-based data may be used to determine anticipated or theoretical values for the sensed values and validate the sensed values based on the anticipated or theoretical values. In some implementations, the historical information may store past values for the sensed values and validate the sensed values based on the past values.

In implementations in which the subsystem 210 validates all of the sensed values, the subsystem 210 may use all of the sensed values in further calculations. In other implementations in which the subsystem 210 does not validate all of the sensed values, the subsystem 210 may discard the sensed values that have not been validated. For example, the subsystem 210 may determine that a particular sensor is not functioning properly during the validation process and may discard the information provided by that sensor. In this example, the subsystem may estimate a value for the sensor using the model-based data and/or historical information and continue operation of the subsystem. The other sensed values may be used in estimating the value for the malfunctioning sensor. For instance, the subsystem 210 may access historical information associated with a past value for the malfunctioning sensor at a time when the other sensed values were the same as or similar to the current sensed values. The subsystem 210 also may input the other sensed values into equations modeling the process being performed by the subsystem 210 and compute an anticipated value for the sensor that is malfunctioning. The continued operation with an estimated value for the malfunctioning sensor may be less accurate and may result in reduced performance.

In some implementations, the subsystem 210 may send a notification message to an operator indicating that the sensor may be malfunctioning and requesting repair or replacement of the sensor. When the sensor is repaired or replaced, the subsystem 210 may resume operation at a preferred level of performance.

The subsystem 210 determines at least one subsystem value (314) and determines uncertainty data associated with the determined subsystem value (316). For example, the subsystem 210 combines the sensed values to produce a new variable or measurement associated with the subsystem and computes uncertainty data for the new variable or measurement. For instance, the subsystem 210 may average or combine two or more related or redundant measurements to produce a new measurement for the subsystem 210. The subsystem 210 may average or combine the two or more related or redundant measurements based on the uncertainty data associated with the measurements. For example, the subsystem 210 may provide a greater weight to a sensed value from a sensor with uncertainty data that indicates that the sensed value is more accurate than another sensed value. In addition, when uncertainty data for a particular sensor indicates that the sensor is malfunctioning (e.g., blind), the subsystem 210 may disregard the sensed value from the particular sensor and only average or combine the other sensed values to arrive at the subsystem value and uncertainty. Alternatively, the subsystem 210 may continue to use the sensed value from a blind sensor, but give it a reduced weight that corresponds to the increased uncertainty of the sensed value.

The subsystem 210 also may compute a new measurement for a quantity or property that was is not directly measured by any of the sensors 212 to 214. In some implementations, the subsystem 210 may access equations that model the process performed by the subsystem 210 and compute a new measurement for a quantity or property by applying the sensed values to the equation. The subsystem 210 also may access equations for computing uncertainty data for the subsystem value based on the sensed values and uncertainty data associated with the sensed values. The subsystem 210 may use model-based data in determining the uncertainty data for the subsystem value.

The uncertainty data for the subsystem value may indicate an accuracy of the subsystem value. The accuracy data may propagate accuracy data associated with the sensors 212 to 214 and reflect adjustments or improvements to the accuracy data made by the subsystem 210 based on model-based data or historical information. For example, the sensors 212 to 214 may determine accuracy information for the sensed values based on general manufacturer information related to the sensors 212 to 214 and the subsystem 210 may adjust the accuracy information provided by the sensors 212 to 214 to account for the sensors 212 to 214 operation in the specific process. For instance, in this example, the subsystem 210 may adjust the accuracy information to indicate that the sensed values are more accurate because the sensors 212 to 214 are particularly suited for the specific process in which they are being used. Alternatively, the subsystem 210 may adjust the accuracy information to indicate that the sensed values are less accurate because the sensors 212 to 214 performance in the specific process is reduced from the general accuracy of the sensors 212 to 214. In other examples, historical information or test data for the specific process performed by the subsystem 210 may be used to adjust the accuracy information for the sensors 212 to 214 (e.g., the sensors 212 to 214 may be theoretically accurate to a certain degree, but actual performance results reveal that the sensors 212 to 214 are actually more or less accurate).

The subsystem 210 sends the subsystem value and uncertainty data associated with the determined subsystem value to the system 230 (318). For example, the subsystem 210 sends the subsystem value and uncertainty data to the system 230 in electronic communications over a wired or wireless communication pathway. The subsystem 210 may send the subsystem value and uncertainty data to the system 230 over a dedicated connection or over a network connection. For instance, the subsystem 210 may send the subsystem value and uncertainty data to the system 230 over a fieldbus.

The system 230 receives subsystem values and uncertainty data for the subsystem values (320). For example, the system 230 receives the subsystem values and uncertainty data in electronic communications over a network or dedicated communication pathway. The system 230 may extract the subsystem values and uncertainty data from the electronic communications and may convert the subsystem values or uncertainty data to a format used by the system 230. The system 230 also may extract identification data from the electronic communications to associate the subsystem values and uncertainty data with the subsystem that produced the subsystem values and uncertainty data.

Although FIG. 3 only illustrates the subsystem 210 as sending subsystem values and uncertainty data to the system 230, other subsystems, including the subsystem 220, send subsystem values and uncertainty data to the system 230 using techniques similar to those described above with respect to subsystem 210. Accordingly, the system 230 may receive subsystem values and uncertainty data from multiple subsystems. Each of the multiple subsystems may be included in the system 230 and perform a particular function for the system 230. The multiple subsystems may perform related operations or may perform different, unrelated operations.

The system 230 reconciles the received subsystem data (322) and detects discrepancies (324). For example, the system 230 may identify measurements of related quantities and determine whether the measurements of the related quantities are consistent. The system 230 may consider the uncertainty associated with each of the related measurements to determine whether the measurements are consistent. For instance, a particular subsystem value may generally be inconsistent with another related subsystem value, but, because of an uncertainty value associated with one of the subsystem values, the inconsistency may be explained by the lower accuracy of one of the subsystem values.

As an example, in implementations in which the system 230 is a liquid transfer system, reconciling the subsystem values and detecting discrepancies may be used to detect leaks in the system 230. In such an arrangement, one subsystem may be a tank and another subsystem may be a flow meter. The tank subsystem may produce a subsystem value that indicates that a first particular quantity of liquid has been transferred out of the tank and the flow meter subsystem may produce a subsystem value that indicates that a second particular quantity of liquid has passed through the flow meter. The system 230 may detect a leak between the tank subsystem and the flow meter if the first particular quantity of liquid that has been transferred out of the tank does not correspond to the second particular quantity of liquid that has passed through the flow meter. The system 230 may take uncertainty data associated with each of the tank subsystem and the flow meter subsystem into account in determining whether a leak exists.

The system 230 may detect a leak if two (or more) measurements of the same quantity differ by more than a given limit, regardless of the uncertainty data associated with the two (or more) measurements.

If the system 230 detects a leak, the system 230 may send a notification message to an operator that a leak has been detected. The notification message may request that the operator identify the problem and correct the problem. The system 230 also may control operation of the system based on the detected leak. For example, the system 230 may use the tank subsystem and flow meter subsystem in which a leak has been detected at a reduced capacity or may route liquid designated to be handled by the tank subsystem and flow meter subsystem in which a leak has been detected to another subsystem in which a leak has not been detected. The system 230 may resume normal operation of the tank subsystem and flow meter subsystem in which a leak has been detected after an operator has indicated that the leak has been fixed.

In some implementations, the system 230 performs mass balancing in an industrial process. For instance, a first subsystem may measure the total mass that has come into the process over a given period of time. A second subsystem may measure the total mass that has gone out of the process over the same period of time. A third subsystem may measure the total mass used within the process. A forth subsystem may measure the total mass remaining in the process at the end of the given period of time, relative to the mass at the beginning of the given period of time. The system 230 may analyze the subsystem values of respective masses of the material and detect a mass imbalance if a discrepancy between the mass subsystem values exists. In implementations in which a discrepancy between the mass subsystem values exists, the system 230 may evaluate, assess, and correct the detected discrepancy or mass imbalance. The system 230 may use uncertainties of the values provided by its subsystems in order to compute probabilities of imbalances, quantities of potential losses, leaks, etc.

The system 230 determines at least one system property based on the subsystem values and the uncertainty data (326). For example, the system 230 combines the subsystem values to produce a new variable or measurement associated with the system 230. The system 230 also may compute uncertainty data for the new variable or measurement. For instance, the system 230 may average or combine two or more related measurements to produce a new measurement related the system 230. The system 230 may average or combine the two or more related measurements based on the uncertainty data associated with the measurements. For example, the system 230 may provide a greater weight to a subsystem value with uncertainty data that indicates that the subsystem value is more accurate than another subsystem value.

The system 230 also may compute a new measurement for a quantity or property that was not directly measured by any of the subsystems. In some implementations, the system 230 may access equations that model the process performed by the system 230 and compute a new measurement for a quantity or property by applying the subsystem values to the equation. The system 230 also may access equations for computing uncertainty data for the system value based on the subsystem values and uncertainty data associated with the subsystem values. The system 230 also may use model-based data and historical information in determining the uncertainty data for the system value.

The system 230 outputs data about system properties (328). For example, the system 230 may output the determined system properties using a display device associated with the system 230. In this example, the system 230 may render a display of the current system properties on a display device located proximate to the system 230. An operator may perceive the current system properties and provide user input to the system 230 based on the displayed system properties. The system 230 also may output the system properties by storing the system properties in electronic storage associated with the system 230 or transmitting the system properties to another electronic device. For instance, the system may send a diagnostic report or notification message to a user interested in and permitted to view the system properties. The diagnostic report or notification message may be sent to any type of electronic device using any type of communication protocol. The system 230 may output the system properties using electronic mail, instant messaging, a phone alert, a pager alert, an updated website, etc.

The system 230 controls the process based on the system properties (330). For example, the system 230 sends control data to the subsystems based on the determined system properties in electronic communications over a wired or wireless communication pathway. The control data may instruct the subsystems to adjust subsystem operating policies or the control data may provide specific instructions to the subsystems to which the subsystems respond. For instance, the control data may indicate that particular subsystems are to be turned off and certain subsystems are to be turned on. The subsystems may operate in accordance with the instructions allowing the system 230 to control the system in an efficient manner. In some implementations, the system 230 may control the system to limit the operations performed by subsystems that are not operating properly and increase the number of operations performed by subsystems that are operating properly. The system 230 may utilize only a subset of the values received from subsystems included in the system 230 in determining control data when particular subsystems produce data with a great uncertainty. The system 230 may maintain operation of subsystems that have a high uncertainty at reduced performance or reduced accuracy. In some implementations, maintaining operation of subsystems that have a high uncertainty at reduced performance or reduced accuracy may be conditioned on a system operator confirming that such operation is acceptable.

Figure 4:
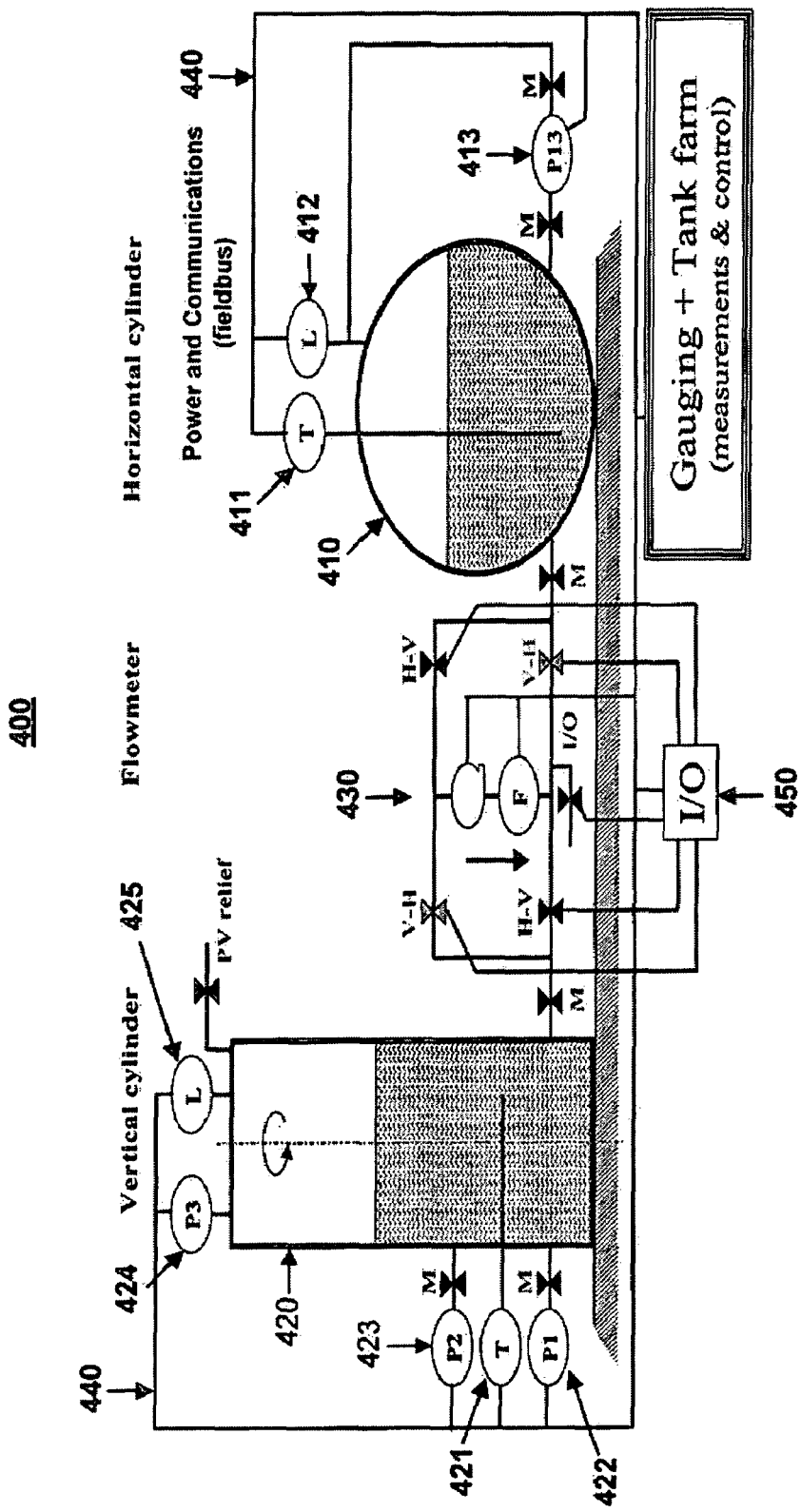
FIGS. 4 and 5 illustrate an example of a system for performing custody transfer.

FIG. 4 illustrates an example of a system 400 for performing custody transfer (i.e., the simultaneous transfer of ownership of a fluid while moving the fluid from the current owner's container to the future owner's container). The system 400 includes a horizontal cylindrical tank 410, a vertical cylindrical tank 420, a flow meter 430, and a control device 450. The horizontal cylindrical tank 410, vertical cylindrical tank 420, and flow meter 430 communicate with the control device 450 over a fieldbus 440. In this exemplary system, both tanks 410 and 420 have a number of gauges performing the measurements of temperature, density, reference density, level, volume, standard volume, and mass of contained liquid. The flow meter 430 may measure an amount of transferred quantities (e.g., volume, mass, etc.) as well as liquid temperature and density.

The horizontal tank 410 includes a temperature sensor 411, a level sensor 412, and a pressure sensor 413. The temperature sensor 411 measures a temperature associated with the liquid included in the horizontal cylindrical tank 410 and the level sensor 412 measures a level of the liquid included in the horizontal cylindrical tank 410. The pressure sensor 413 is a differential pressure sensor provided at a lower portion on the horizontal cylindrical tank 410 and measures the hydrostatic head of the liquid in the horizontal cylindrical tank 410 (e.g., mass).

The horizontal cylindrical tank 410 may be pressurized. When using stable liquids at normal pressures, the horizontal cylindrical tank 410 may be freely vented or may have a pressure/vacuum relief valve. Provision may be made for correcting the calibration parameters for static pressure although this may not apply. The tank construction may exhibit significant deformations of the tank body and ends due to internal pressure and temperature. The ensuing errors may be removed by calculations based on liquid calibration, and residual errors may be added to the calibration uncertainties.

The gauges included on the horizontal cylindrical tank 410 may be built on the tank or may be otherwise attached to the tank in a configuration in which the sensors may sense values associated with the process. The gauges may consist of one or several sensors whose combinations measure liquid temperature, density, reference density, level, volume, standard volume, and mass. Where variables are not measured (e.g., density in a level gauge), appropriate entries of both the values and their expected uncertainties may be made by the user.

In the implementation shown in FIG. 4, on the horizontal tank 410, there are three gauges: level, part hydrostatic, and hybrid. A full hydrostatic gauge is not provided on the horizontal tank 410. This reflects situations in which a density-measuring sensor would neither be practical because of the limited height of the tank or not be allowed for safety reasons. All gauges may share one averaging temperature gauge.

The vertical tank 420 includes a temperature sensor 421, a first pressure sensor 422, a second pressure sensor 423, a third pressure sensor 424, and a level sensor 425. The temperature sensor 421 measures a temperature associated with the liquid included in the vertical cylindrical tank 420 and the level sensor 425 measures a level of the liquid included in the vertical cylindrical tank 420. The first pressure sensor 422 may be fitted as low on the tank as possible and the third pressure sensor 424 may be fitted to measure the "vapor" pressure on the vertical tank. Values of the first pressure sensor 422 and the third pressure sensor 424 may be combined to measure a differential pressure in the vertical tank 420 and may provide similar information as the pressure sensor 413 included on the horizontal tank 410. If fitted (e.g., for a full hydrostatic gauge only), the second pressure sensor 423 may be positioned about 2.5 m above the first pressure sensor 422. In this arrangement, the difference between the value of the second pressure sensor 423 and the first pressure sensor 422 measures differential liquid head from which density may be computed. If the second pressure sensor 423 is not fitted, or if the liquid level drops below it, the density may be entered manually or derived from historical records.

The sensors may be mounted on isolation valves. The valves also may be used to demonstrate the effects of over-ranging of the sensors (and their subsequent recovery). In some implementations, a part-hydrostatic gauge may be a calculation option, where the second pressure sensor 423 is ignored and manually-entered density is used.

A hybrid gauge may combine the first and third pressure sensors 422 and 424 and measure hydrostatic head (e.g., mass) with a level sensor 425 used to measure volume. A combination of the sensed values from the first and third pressure sensors 422 and 424 and the sensed value from the level sensor 425 may be used to measure density. A level value may be a calculation option for calculation of liquid mass, where the first and third pressure sensors 422 and 424 are ignored and manually-entered density is used.

The vertical tank 420 may have a fixed roof and pressure-vacuum (PV) relief valve to vent excessive ullage pressure/vacuum. A calibration table associated with the vertical tank 420 may be corrected (e.g., with appropriate uncertainties) for tank bulging due to hydrostatic forces.

In the implementation shown in FIG. 4, on the vertical tank, there are all four types of gauges. All gauges share one single-point temperature gauge.

In some implementations, both vertical and horizontal tanks 410 and 420 may be calibrated. Standardized procedures for estimating calibration uncertainties (e.g., ISO 7507) may be used for the vertical tank 420. Equations may be derived to estimate calibration uncertainties of the horizontal tank 410.

The flow meter 430 may be a multi-variable flow meter that measures amounts of transferred quantities (e.g., volume, mass) as well as the liquid temperature and density. The flow meter 430 may measure an amount of liquid transferred between the horizontal tank 410 and the vertical tank 420 or the flow meter 430 may measure the flow fate of liquid passing between vertical tank 420 and the horizontal tank 410. The flow meter 430 may be a Coriolis mass flow meter.

The fieldbus 440 may be configured to facilitate exchange of electronic information between the gauges on the horizontal cylindrical tank 410, the gauges on the vertical cylindrical tank 420, the flow meter 430, and the control device 450. For instance, the gauges on horizontal cylindrical tank 410, the gauges on vertical cylindrical tank 420, and the flow meter 430 may send sensed values and uncertainties to the control device 450 using the fieldbus 440. The fieldbus 440 may be a carrier loop including a twisted pair of wires that carry digital information. Although only a single fieldbus is shown, systems may include multiple fieldbuses or other wired or wireless communication pathways for communicating electronic information.

The control device 450 includes an input/output interface with which the control device 450 receives electronic communications from the fieldbus 440. The electronic communications may be sent from the gauges on horizontal cylindrical tank 410, the gauges on vertical cylindrical tank 420, and the flow meter 430 and may include information related to sensed values and uncertainty data.

The control device 450 may be a personal computer or any other type of electronic device that includes control circuitry or one or more processors for controlling an industrial process. The control device 450 may collect raw data from all sensors, execute calculations normally done in transmitters or sensors (e.g., sensor layer calculations), with added uncertainty calculations, execute all calibration and gauging calculations (e.g., subsystem layer calculations), including uncertainty calculations, execute measurement reconciliation calculations (e.g., system layer calculations) based on uncertainties, provide a user interface (e.g., a graphical user interface), provide user input mechanisms for parameterization of transmitters (if needed), provide for alarm or notification messages, and provide for data logging.

Figure 5:
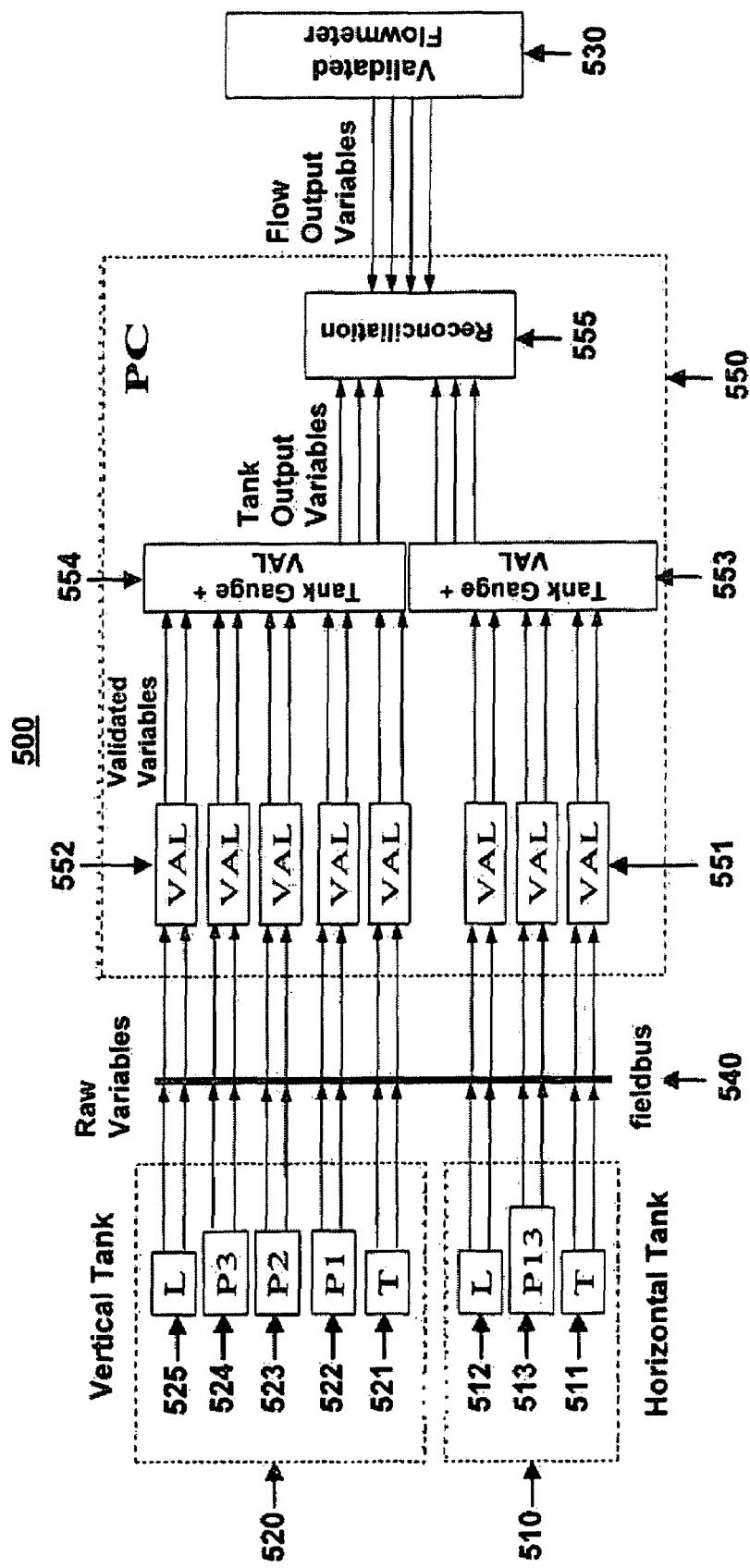

FIG. 5 illustrates an example of a system 500 for performing custody transfer. The system 500 corresponds to the system 400 shown in FIG. 4. For example, the system 500 includes a horizontal tank 510 with its gauges, a vertical tank 520 with its gauges, a flow meter 530, a control device 550, and a fieldbus 540. The horizontal tank 510, the vertical tank 520, the flow meter 530, the control device 550, and the fieldbus 540 correspond to the horizontal tank 410, the vertical tank 420, the flow meter 430, the control device 450, and the fieldbus 440 shown and described above with respect to FIG. 4.

In addition, the horizontal tank 510 includes a temperature sensor 511, a level sensor 512, and a pressure sensor 513 that correspond to the temperature sensor 411, the level sensor 412, and the pressure sensor 413 included in the horizontal tank 410. Similarly, the vertical tank 520 includes a temperature sensor 521, a first pressure sensor 522, a second pressure sensor 523, a third pressure sensor 524, and a level sensor 525 that correspond to the temperature sensor 421, the first pressure sensor 422, the second pressure sensor 423, the third pressure sensor 424, and the level sensor 425 included in the vertical tank 420.

The system 500 illustrates the hierarchical nature of a validated system that includes three layers. For instance, the first layer includes primary sensors and measurements of tank dimension, the second layer includes a calibrated tank with a tank gauge, and the third layer includes a tank farm with reconciliation between tank gauges and flow meters. The first layer may include validated sensors such as pressure sensors, temperature sensors, level sensors, calibrated tanks (e.g., both vertical and horizontal), and flow meters.

The system 500 also may be realized by embedding the components 551 and 552 (validation processes) inside the first layer sensors. In this case, the fieldbus communications will occur between the outputs of components 551 and 552 and inputs of components 553 and 554.

The system 500 also may be realized by further embedding the components 553 and 554 (validated tank gauges) inside one of the first layer sensors. In this case, the fieldbus communications will occur between the outputs of components 553 and 554 and inputs of component 555.

The sensor layer processing components 551 and 552 may receive first layer information from the gauges on horizontal tank 510 and the gauges on vertical tank 520, respectively. The components 551 and 552 may be physical electronic components included in the control device 550, may be processes executed by a processor included in the control device 550, or may be embedded in the sensors. The components 551 and 552 may receive sensor data (e.g., raw variables) and uncertainty data, validate the data, and generate values and uncertainties based on the data.

The subsystem layer processing components 553 and 554 may receive validated sensor data and uncertainty data and determine second layer data based on the validated sensor data and uncertainty data. The components 553 and 554 may be physical electronic components included in the control device 550, may be processes executed by a processor included in the control device 550, or may be embedded in the sensors. The second layer may include subsystems (e.g., tank gauges). The components 553 and 554 may be configured to determine different subsystem values or properties for the subsystems. For example, the component 554 may determine a level included in the vertical tank 520 using validated values of the level sensor 525 and the temperature sensor 521. In addition, the properties may be part-hydrostatic (e.g., using values from the first and third pressure sensors 522 and 524 and the temperature sensor 521), may be hydrostatic (e.g., using values from all three pressure sensors 522-524 and the temperature sensor 521), and may be hybrid (e.g., using values from the first and third pressure sensors 522 and 524, the level sensor 525, and the temperature sensor 521). The components 553 and 554 may include model-based inferences for each individual gauge.

The system layer processing component 555 may receive subsystem data and uncertainty data produced by the subsystem layer processing components 553 and 554 or received directly from a sensor (e.g., flow meter 530 when flow meter determines flow conditions from its own sensor data) and determine third layer data based on the subsystem data, sensor data, and uncertainty data from all sources. The component 555 may be a physical electronic component included in the control device 550 or may be a process executed by a processor included in the control device 550. The third layer of the system 500 may be for a system (e.g., tank farm). The third layer may include model-based inferences, may compare validated measurements between gauges on one tank, and may reconcile validated measurements between tank gauges and flow meter(s). Leak detection and/or loss of control may be determined based on uncertainties of validated measurements.

Figure 6:
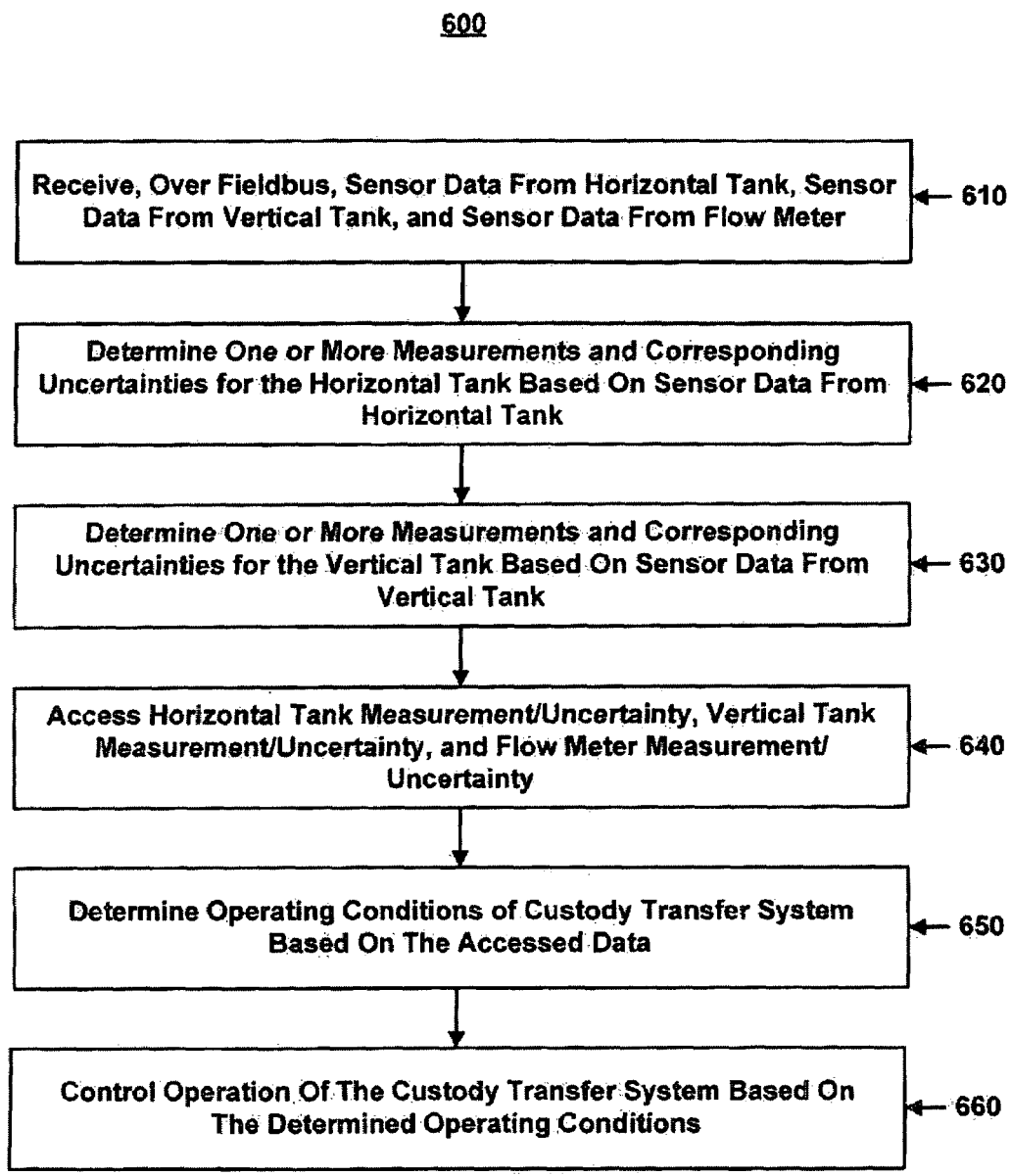
FIG. 6 illustrates an example of a process for controlling operation of the system for performing custody transfer shown in FIGS. 5 and 6.

FIG. 6 illustrates an example of a process for controlling operation of the system for performing custody transfer shown in FIGS. 4 and 5. For convenience, particular components described with respect to FIGS. 4 and 5 are referenced as performing the process 600. However, similar methodologies may be applied in other implementations where different components are used to define the structure of the system, or where the functionality is distributed differently among the components.

The control device 550 receives, over the fieldbus 540, tank calibration data and sensor data from the gauges on the horizontal tank 510, tank calibration data and sensor data from the gauges on the vertical tank 520, and sensor data from the flow meter 530 (610). For example, the sensor data may be received in electronic communications over the fieldbus 540. The sensor data may include measurements of tank dimensions (e.g., for tank calibration), measurements of pressure, temperature and level sensors (e.g., in the tank gauges), and measurements of flow (e.g., direct sensor data from the flow meter 530).

The sensor layer processing components 551 and 552 may validate the sensor data and pass the validated sensor data to the upper layers (e.g., sub-systems and/or systems). For instance, the sensor layer processing components 551 and 552 may send the validated sensor data to the subsystem layer processing components 553 and 554. The sensor layer processing components 551 and 552 may validate the sensor data using model-based and historical information and may determine whether each of the sensors is functioning properly. The sensor layer processing components 551 and 552 also may add to or update uncertainty data associated with the sensor data.

Calculations and estimates of uncertainty for sensor data may produce results (e.g., pressure, temperature, level) under all circumstances. Even if sensors are at fault (e.g., status is BLIND), the sensor may supply a value based on its historical records. Uncertainties of individual sensors may be derived from manufacturer's information on manufacturing processes, factory characterization/calibration, uncharacterized influences, effects of abnormal operating conditions, effect of recoverable faults (e.g., over-ranging), field calibration, etc.

Under normal operation, it may be assumed that the uncertainties of the sensors are not constant, but vary with changes both in the measured and other influencing quantities. Attempts may be made to correct for errors and an estimate may be made of the residual (e.g., uncorrected) errors that may then be included in the (e.g., variable) uncertainties. Functions may be produced for estimating dynamic uncertainty associated with the sensors (e.g., level, temperature). For instance, a value of a pressure sensor (e.g., the third pressure sensor 524) may be influenced by the temperature at which the pressure sensor is performing the measurement and the uncertainty data associated with the pressure sensor (e.g., the third pressure sensor 524) may be based on a measured temperature (e.g., a temperature measured by temperature sensor 521). The uncertainties may be computed in real time, for given operating conditions and statuses of measured variables also may be produced.

Abnormal operation may occur when operation is outside of the characterized/calibrated ranges, operation that follows a sensor stress outside its design limits (this may be permanent or may gradually self-heal with time or with cycles of the measured variable through its normal ranges), "aging" of the device, loss of contacts, etc. Under abnormal operation, validating the sensor data may consider these types of abnormalities. For example, the effects of abnormalities may be corrected for as much as possible and residual (e.g., uncorrected) errors may be estimated and included in the uncertainties.

The control device 550 determines one or more measurements and corresponding uncertainty values for the horizontal tank 510 based on the sensor data received from the horizontal tank gauges 510 (620) and the control device 550 determines one or more measurements and corresponding uncertainty values for the vertical tank 520 based on the calibration table and sensor data received from the vertical tank 520 (630). For example, the subsystem layer processing components 553 and 554 may use the validated data from the layer below (e.g., data from the sensor layer processing components 551 and 552) in order to determine subsystem measurements (e.g., tank calibration table/parameters, liquid density, inventories or transferred quantities of mass, volume, standard volume, etc.) and corresponding uncertainty values. Detailed calculations of specific examples of determining measurements and corresponding uncertainty values for the horizontal and vertical tanks 510 and 520 are described below. The calculations shown below illustrate specific examples and similar techniques may be applied to other examples in other situations.

Normal operating conditions may occur when all data received from the sensor layer is CLEAR or BLURRED, all sensors are in contact with the liquid (e.g., according to the tank gauge model), and there is no stratification of the liquid inside the tank. The tank gauge (e.g., subsystem layer processing components 553 and 554) may combine all input data (e.g., from the sensor layer) according to its (e.g., tank gauge) models. Propagation of source uncertainties (e.g., from the sensor layer) may be derived from the normal calculations performed by the gauge.

The system also may operate under abnormal operating conditions, including presence of faults. Abnormal operating conditions may include density-measuring pressure sensor on vertical tank 520 being uncovered (e.g., density no longer measured), temperature sensor on either tank being uncovered, loss of vapor-pressure sensor (e.g., the third pressure sensor 524) on the vertical tank 520, loss of density-measuring sensor (e.g., the second pressure sensor 523) on the vertical tank 520, loss of main pressure sensor (e.g., the first pressure sensor 522 or the pressure sensor 513) on either tank, loss of temperature sensor on either tank, loss of level sensor on either tank, loss of all main sensors on either tank, condensation in the dry leg of the pressure sensor 513 on the horizontal tank 510, recovery from over-range of pressure sensor at the bottom of the tank, faults on the flow meter 530, and any other type of abnormal operating condition.

Loss of a sensor may result when a sensor variable goes BLIND due to an internal failure or the sensor variable does not reach the control device 550 due to failure of the communication system (e.g., fieldbus 540). In the event of loss of a sensor the tank gauges may infer outputs from alternative sources using known models of tank gauge(s). For example, the value of the third pressure sensor 524 may be inferred from the value of the first pressure sensor 522 on tanks with a PV relief valve, the value of the first pressure sensor 522 may be inferred from the value of the third pressure sensor 524 on tanks with a PV relief valve, the value of the second pressure sensor 523 may be inferred from the value of the first pressure sensor 522 using records of (stratified) density, the value of the first pressure sensor 522 may be inferred from the value of the second pressure sensor 523 using records of (stratified) density (e.g., when the second pressure sensor 523 is covered), the value of the level sensor 525 may be inferred from the value of the first pressure sensor 522 (e.g., volume calculated as in hydrostatic gauge using records of (stratified) density), and the value of the first pressure sensor 522 may be inferred from the value of the level sensor 525 (e.g., mass calculated as in level gauge using records of (stratified) density). Using inferential or estimated measurements may allow continued use of the tank farm system, perhaps with reduced, but still sufficient accuracy.

The subsystem layer processing components 553 and 554 may use a model of the process (e.g., tank gauging with or without liquid stratification) to modify the validation data from the first layer (e.g., from sensor layer processing components 551 and 552) according to the appropriate models. Variables, uncertainties and measured value statuses of tank gauge outputs may be modified according to the model. Propagation of measured value statuses may deviate from normal rules.

Normal rules may indicate an output as CLEAR if and only if all related inputs are CLEAR. Normal rules also may indicate an output as BLIND if any of its related inputs is BLIND. Normal rules further may indicate an output as BLURRED in any other case.

Exceptions to this rule may exist where an input variable is an influencing quantity and has only very small impact on the output variable. Engineering judgment may be used in these cases.

Although no hard-and-fast rule exists, in general the variables that are added to or multiplied by the "main" variable may be considered to be other "process" variables while those that get multiplied by a factor and then added to 1 before application in the calculation formula may be "influencing" quantities. For instance, in the equation (1) for mass in hydrostatic gauge on a vertical tank:

$$M = (P1-P3)/g*A*[1-a*(T-Tref)] \tag{1}$$

P1 (e.g., the value from the first pressure sensor 522) is the "main" variable, P3 (e.g., the value from the third pressure sensor 524), A (e.g., the value of effective cross-sectional area of the tank obtained from its calibration data), and g (e.g., the value of acceleration due to gravity where the tank is located) are the other "process" variables, T (e.g., the value of temperature of the tank shell) is the "influencing" quantity. If a (e.g., the value of coefficient of thermal expansion of the tank shell) is small, the influence of T is negligible.

The calculations and estimates of uncertainty may produce outputs for subsystem values and uncertainty data (e.g., measurements of volume and mass of the liquid in the tank) under all conditions. The tank gauge (e.g., the subsystem layer) may use model-based inferences as well as historical data in presence of process aberrations (e.g., sensor not covered by the liquid, stratification) and faults (e.g., lost sensors).

Equations for calculations of uncertainties may be derived from the equations for calculations of variables, using rules provided in the Guide to the Expression of Uncertainty of Measurements (GUM—ISO 17025). Other standards also may be taken into account. For instance, ISO 7507 provides basic equations for uncertainties of calibration of vertical tanks, ISO 12917 provides basic equations for calibration of horizontal cylindrical tanks, ISO 11223 provides some basic equations for uncertainties under normal operating conditions for hydrostatic gauges on vertical tanks, ISO 15169 provides some basic equations for uncertainties of inventory measurements under normal operating conditions for hybrid (and level) gauges. Remaining equations may be derived.

Uncertainties may be combined using a "weighted RMS" rule. Prior to deriving weights of individual input uncertainties, the equations for calculations of measured variables may be simplified by neglecting some of the secondary effects. Appropriate engineering judgment may be applied where required.

In some examples, a temperature sensor may be uncovered or lost. If the sensor was previously covered, the temperature may remain the same (e.g., unchanged or frozen) and its uncertainty may remain the same while there is no movement of the stored liquid (e.g., level is constant). The temperature uncertainty may increase if it is known that the liquid below the temperature sensor is stratified and the liquid is being pumped out (e.g., level is decreasing). All possible corrections to the temperature may be done first and the additional uncertainty may relate to residual errors after the correction. The temperature uncertainty also may increase if the liquid is being pumped in (e.g., level is increasing) whose temperature is not known. The temperature of the incoming liquid may be assumed to be within the range of "historical data" (e.g., within the range of the prior minimum temperature and prior maximum temperature) and the uncertainty may relate to the estimate of the mix of the "old" and "new" liquids. For instance, their uncertainties may be computed as shown in equation (2):

$$uT = L_{fr}/L * uT_{fr} + (L - L_{fr})/L * (T_{MIN} + T_{MAX})/(2*3^{1/2}) \quad (2)$$

$uT$ is the value of temperature uncertainty, $L_{fr}$ is the value of level at which the temperature sensor was uncovered or temperature sensor was lost, L is the value of the current level, $T_{MIN}$ and $T_{MAX}$ are respectively the values of maximum and minimum temperature recorded by the historian, $uT_{fr}$ is the value of temperature uncertainty when the temperature sensor was uncovered or temperature sensor was lost.

The temperature uncertainty also may increase if the liquid is being pumped in (e.g., level is increasing) whose temperature, $T_{ext}$, and its uncertainty, $uT_{ext}$, are known. The temperature and uncertainty for the temperature may be calculated as shown in equations (3) and (4):

$$T = L_{fr}/L * T_{fr} + (L - L_{fr})/L * T_{ext} \quad (3)$$

$$uT = \operatorname{sqrt}\{[L_{fr}/L * uT_{fr}]^2 + [(L - L_{fr})/L * uT_{ext}]^2\} \quad (4)$$

where, as above, the subscript fr indicates the "frozen" values of level, temperature and its uncertainty just before the failure, and factor $(2*3^{1/2})$ calculates the standard uncertainty of the (absolute) range of $(T_{MAX} - T_{MIN})$ where the probability of error is assumed to have rectangular distribution.

If the temperature sensor was not previously covered (e.g., after initialization when no records exist of the temperature of the "old" liquid), the uncertainty of temperature may be based on historical data. Temperature may be assumed to be the average of historical data and the extended uncertainty may be assumed to be the half-width of the band of the historical data.

If the third pressure sensor 524 is lost (e.g., is malfunctioning, historical data for the third pressure sensor 524 may provide parameters that are used to derive the value of the third pressure sensor 524 from variations of the first pressure sensor 522 during liquid movement and under steady-state conditions in a tank with PV relief valve. A similar technique also may be used to derive the value for the first pressure sensor 522 from the third pressure sensor 524 when the first pressure sensor 522 is lost, but this will depend on accuracy of accumulations of individual steps of the third pressure sensor 524 and may result in larger and less acceptable uncertainties.

When the PV valve is closed, movement of the liquid in or out of the tank may cause rise or fall respectively of the value of the third pressure sensor 524. This movement may continue until the PV relief valve opens when its pre-set limit has been exceeded.

When the PV valve opens (e.g., momentarily), the value of the third pressure sensor 524 may drop to that of a residual pressure/vacuum. Variations of the third pressure sensor 524 with level may therefore resemble a saw-tooth wave whose steps correspond to opening of the PV relief valve. The rate of rise/fall of the third pressure sensor 524 may correspond to each "tooth" of the wave (but may vary with level of the liquid) and may be the same as the rate of rise/fall of the first pressure sensor 522.

When the movement of the liquid stops, the value of the third pressure sensor 524 may end up at a positive (e.g., following movement IN) or negative (e.g., following movement OUT) value. These values may decay to zero due to leaks in the PV valve and/or in the roof of the tank. Rates of leaks (e.g., from a positive value of the third pressure sensor 524 or from a negative value of the third pressure sensor 524 respectively) in static conditions may be independent of level.

In some arrangements, the value of the third pressure sensor 524 is expected to follow the standard equation for gasses shown in equation (5):

$$P_3 * V = R * N * T \quad (5)$$

where T is absolute temperature (assumed constant), R is the universal gas constant, V is the volume of the gas in the vapor space, $P_3$ is the absolute pressure in the vapor space, and N is the number of gas molecules in the vapor space that are in turn a function of volume of the vapor space N(V).

The number of molecules, N(V), may remain constant while PV valve is shut and reduce in proportion to old-to-new volume when PV valve opens. The relative measure may be obtained (as an approximation) from relative volumes at the points when PV valve has just opened as shown in equation (6):

$$N(V_{new}) = N(V_{old}) * V_{new}/V_{old} \quad (6)$$

In a vertical tank, volume of gas (in-tank vapor) may be computed as shown in equation (7):

$$V = (L_{max} - L) * A \quad (7)$$

where L is liquid level, $L_{max}$ is (equivalent) level of tank roof (constant), and A is cross-sectional area of the tank (constant for vertical cylindrical tanks).

The number of molecules in the vapor volume (after PV valve is fired) may be computed as shown in equation (8):

$$N(V_{new}) = N(V_{old}) * (L_{max} - L_{new})/(L_{max} - L_{old}) \quad (8)$$

where $L_{old}$ is liquid level at which the PV valve opened the time-before-last, $L_{new}$ is liquid level at which the PV valve opened the last time, and $N(V_{old})$ is the number of molecules (related to volume) when PV valve opened the time-before-last.

Level increment ($\Delta L_f$) between two previous firings of PV valve may be computed as shown in equation (9):

$$\Delta L_f = L_{new} - L_{old} \quad (9)$$

While PV valve is shut, the absolute pressure $P_3$ may be calculated as shown in equation (10):

$$P_3 = R * N(V_{new}) * T/[(L_{max} - L) * A] \quad (10)$$

The rate of change of $P_3$ with level may be calculated as shown in equation (11):

$$\Delta P_3 = \delta P_3/\delta L * \Delta L = \Delta L * R * N * T/[(L_{max}-L)^2 * A] \quad (11)$$

where $\delta P_3/\delta L$ is the differential (rate of change) of $P_3$ against level, $\Delta L$ is increment of level L from the level when the PV valve last fired.

Events when liquid is being pumped in (e.g., rising level) is described below as an illustrative example. A case of falling level will involve similar processes.

The PV valve opens at level $L_{i-1}$, immediately after firing. At this time, the pressure ($P_3$) equals the positive residual pressure ($P_{pr}$). The number of molecules may be computed as shown in equation (12):

$$N_{i-1} = k*A*(L_{max}-L_{i-1}) \quad (12)$$

where k is (an unknown) constant.

After firing at level $L_{i-1}$ the number of molecules $N=N_{i-1}$ (valve shut) at (rising) level L, the rate of change of $P_3$, and $P_3$ may be computed as shown in equations (13) and (14):

$$\Delta P_3 = R*T*k*A*(L_{max}-L_{i-1})*(L-L_{i-1})/[A*(L_{max}-L)^2] \quad (13)$$

$$P_3 = P_{pr} + \Delta P_3 \quad (14)$$

Prior to firing at level $L_i$ (e.g., the number of molecules $N=N_{i-1}$ (valve shut)), the pressure difference may be computed as shown in equation (15):

$$P_{pf}-P_{pr} = R*T*k*A*(L_{max}-L_{i-1})*(L_i-L_{i-1})/[A*(L_{max}-L_i)^2] \quad (15)$$

When the PV valve opens at level $L_i$ (immediately after firing), $P_3$ and the number of molecules may be computed as shown in equations (16) and (17):

$$P_3 = P_{pr} \text{ (positive residual pressure)} \quad (16)$$

$$N_i = k*A*(L_{max}-L) \quad (17)$$

After firing at level $L_i$ (e.g., number of molecules $N=N_i$ (valve shut) at (rising) level L), the rate of change of $P_3$ and $P_3$ may be computed as shown in equations (18) and (19):

$$\Delta P_3 = R*T*k*A*(L_{max}-L)*(L-L_i)/[A*(L_{max}-L)^2] \quad (18)$$

$$P_3 = P_{pr} + \Delta P_3 \quad (19)$$

Prior to firing at level $L_{i+1}$ (e.g., number of molecules $N=N_i$ (valve shut)), the pressure difference may be computed as shown in equation (20):

$$P_{pf}-P_{pr} = R*T*k*A*(L_{max}-L_i)*(L_{i+1}-L_i)/[A*(L_{max}-L_{i+1})^2] \quad (20)$$

where $P_{pf}$ is the pressure prior to firing and $P_{pr}$ is the positive residual pressure.

Assume that PV valve opens at $L_i(P_{1i})$. When this occurs, $P_3 = P_{pr}$. $P_3$ then rises/falls at the rate shown above. When it reaches its firing point ($P_f$), the valve opens again. This happens at a level $L_{i+1}(P_{1i+1})$ where the pressure at the firing point may be calculated as shown in equations (21) and (22):

$$P_f = (L_{i+1}-L_i)*R*T/[(L_{max}-L_{i+1})^2*A] \quad (21)$$

$$P_f = (P_{1i+1}-P_{1i})*g*\rho*R*T/[(P_{1max}-P_{1i+1})^2*A] \quad (22)$$

where g is the value of acceleration due to gravity and $P_{1max}$ is the value of pressure $P_1$ when the tank is full of liquid, corresponding to level $L_{max}$.

The pressure at the firing point ($P_f$) may equal $P_p$ for rising pressure/level (over-pressure) and may equal $P_v$ for falling pressure/level (vacuum). $P_p$ and $P_v$ are inherently not equal and both may be established by historical data.

This leads to equations (23) through (26):

$$P_f*A*(L_{max}-L_{i+1})^2 = R*T*(L_{i+1}L_i) \quad (23)$$

$$L_{max}^2 - 2*L_{max}*L_{i+1} + L_{i+1}^2 = K_L*(L_{i+1}-L_i) \quad (24)$$

where:

$$K_L = R*T/(P_r*A) \quad (25)$$

$K_L$ is a product of level and number of molecules at the point at which the PV valve fires, defined in equation (25).

$$L_{i+1}^2 - (2*L_{max}+K_L)*L_{i+1} + L_{max}^2 + K_L*L_i = 0 \quad (26)$$

whose solution is shown in equations (27) and (28):

$$L_{i+1} = (L_{max}+K_L/2) - \text{sqrt}\{(L_{max}+K_L/2)^2 - (L_{max}^2 + K_L*L_i)\} \quad (27)$$

$$L_{i+1} = (L_{max}+K_L/2) - \text{sqrt}\{K_L*(L_{max}-L_i) + K_L^2/4\} \quad (28)$$

The rate of change of $P_3$ with level (as above) may be computed as shown in equation (29):

$$\delta P_3/\delta L = R*T/[(L_{max}-L)^2*A] = K_L*P_f/(L_{max}-L)^2 \quad (29)$$

The rate of change of $P_3$ against level may be proportional to $(L_{max-Lf})*(L-L_f)/(L_{max}-L)^2$. Data regression for the function $\Delta P_3 = f(L)$ may be applied to the function as shown in equation (30):

$$\Delta P_3 = S*(L_{max}-L_f)*(L-L_f)/(L_{max}-L)^2 + O \quad (30)$$

where $L_f$=level at which PV valve last opened, $L_{max}$=height of the tank roof, and S, O are the resulting regression coefficients (different for rising and falling levels).

The fact that upon firing of the PV valve, $P_3$ returns to $P_{rp}$ (or $P_{rv}$) rather than zero, only may be considered when $P_3$ is being reconstructed while the status of $P_3$ is BLIND. Data regression in static mode assumes that the rate of decline (against time) of $P_3$ may be proportional to the magnitude of $P_3$. Therefore the (exponential) function may be used to fit the data as shown in equation (31):

$$\Delta P_3 = \Delta P_{30}*\exp\{-\tau*(t-t_0)\} \quad (31)$$

where $\tau$=time constant of the leak(s)—obtained as regression coefficient, t=time [sec], $t_0$=time when liquid movement ceases (and leakage begins), and $\Delta P_{30} = \Delta P_3$ at $t=t_0$.

Uncertainty of $P_3$, when BLIND, may be estimated from that of $P_1$ as shown in equation (32):

$$uP_3 = \text{sqrt}(uP_1^2 + uP_{3ad}^2) \quad (32)$$

where $uP_1$ is the uncertainty of $P_1$ and $uP_{3ad}$ is an additional uncertainty derived from residual errors established by experimental work.

As noted above, normal operating conditions may imply that the status of all input variables is CLEAR or BLURRED, that all sensors are in contact with the process, and the liquid is homogeneous. Normal operating conditions also may imply that the communications system delivers all measured values, their uncertainties, and statuses.

Under normal operating conditions, the inventory value (i.e. the measure of quantity in the tank) may be computed as shown in equation (33):

$$M = \left\{\left[\frac{P_1 - P_3}{g} - H_3*(\rho_v - \rho_a)\right]*A_E*\frac{\rho}{\rho - \rho_v} + (H_1*A_1 - L_W*A_W)*\rho\right\}*E_{shell} - W_R \text{ [kg]} \quad (33)$$

where $P_1$ is pressure measured at elevation $H_1$ near the bottom of the tank, $P_3$ is pressure measured at elevation $H_3$ at the top of the tank, g is the acceleration due to gravity, $\rho_v$ is the density of in-tank vapor in the ullage space (e.g., between the liquid and the roof of the tank), $\rho_a$ is the density of ambient air, $\rho$ is the density of the liquid, calculated as shown below, $A_E$ is the average cross-sectional area of the tank up to the level of the liquid, $A_1$ is the average cross-sectional area of the tank up to the level $H_1$ (elevation of sensor $P_1$), $A_W$ is the average cross-sectional area of the tank up to the level $L_W$ of the in-tank sediment and/or water, $E_{shell}$ represents the thermal expansion of the tank shell, and $W_R$ is the mass of the floating roof (if any).

Observed density $\rho$ may be calculated from pressures as shown in equation (34):

$$\rho = \frac{P_1 - P_2}{g * H_2} + \rho_a \;\; [kg/m^3] \tag{34}$$

where $P_2$ is pressure measured at elevation $H_2$ above the sensor $P_1$.

Alternatively, observed density may be calculated from manually entered reference density and temperature.

In this implementation, uncertainty may be calculated as shown in equation (35):

$$\frac{uM}{M} = \sqrt{\frac{\frac{((1+H_r)*uP_1)^2 + (H_r*uP_2)^2 + uP_3^2}{(g*\rho)^2} + (H_r*uH_2)^2 + uH_1^2 + uL_W^2}{(L-L_W)^2} + \left(\frac{uA_E}{A_E}\right)^2 + \left(\frac{uW_R}{M}\right)^2} \tag{35}$$

where height ratio $H_r$ is defined as shown in equation (36):

$$H_r = \frac{H_1 - L_W}{H_2} \tag{36}$$

and $uP_i$ are uncertainties of the respective pressures, $uH_i$ are uncertainties of the respective elevations of pressure sensors, $uL_W$ is uncertainty of the level of in-tank sediment/water, $uA_E$ is uncertainty of the cross-sectional area of the tank, assumption being made that approximately $A_E=A_1=A_W$ (and $uA_E=uA_1=uA_W$), and $uW_R$ is uncertainty of the mass of floating roof (if any). The uncertainty of g is assumed to be negligible.

All measurement errors may be assumed to be normally distributed, with their density of probability following the Gaussian curve. Therefore, if the uncertainties of the inputs are equal to standard deviations of their respective error distributions, the uncertainty of the output also represents one standard deviation of the distribution of the resulting errors.

For abnormal conditions, sets of rules may cover every conceivable occurrence of aberrations and failures or combinations thereof. The following example shows handling of calculations of mass by a hydrostatic tank gauge when the third pressure sensor 524 ($P_3$) is lost (e.g., status goes BLIND or its communications fail).

As shown above, additional uncertainty $uP_{3add}$ may be estimated from the uncertainty of interpolation of the ($P_1-P_3$) wave and the expected long-term changes of the detected slopes. For example, standard uncertainties of pressure $P_1$, $P_2$, $P_3$ being shown by equation (37)

$$uP_i = uP_{izero} + uP_{ilin}*P_i = 14.4 + 0.0002*P_i [Pa] \tag{37}$$

where $uP_{izero}$ is the zero offset of the uncertainty of pressure $P_i$, i.e. uncertainty of pressure $P_i$ ($P_1$, $P_2$ or $P_3$) when $P_i=0$ and $P_{ilin}$ is the slope at which the uncertainties of $P_i$ grow with growing absolute value of $P_i$. Equation (37) and the values of $uP_{izero}$ and $uP_{ilin}$ have been estimated as approximations from related work.

Additional standard uncertainties of inferred pressure $P_3$ may be shown by equation (38):

$$uP_{3add} = 50 + 0.001*P_1 [Pa] \tag{38}$$

A simplified equation for transferred mass may be based on assumptions that density of liquid below $H_1$ (height of the sensor $P_1$ and of the bottom tap of sensor $P_{13}$ respectively) and free water level $L_W$ are the same at the start and at the end of the transfer ($\rho_o=\rho_c$, $L_{Wo}=L_{Wc}$).

For vertical tanks, the transferred mass may be calculated as shown in equation (39):

$$M_x = A_E * \frac{(P_{1o} - P_{1c}) - (P_{3o} - P_{3c})}{g} \;\; [kg] \tag{39}$$

where area $A_E$ is assumed to be constant, $P_{1o}$ and $P_{3o}$ are the pressures at the opening of transfer, $P_{1c}$ and $P_{3c}$ are the pressures at the close of transfer.

While neglecting the uncertainty of the gravity acceleration factor g and thermal expansion, the relative uncertainty of transferred mass may be calculated as shown in equation (40):

$$\frac{uM_x}{M_x} = \sqrt{\frac{u(P_{1o} - P_{1c})^2 + u(P_{3o} - P_{3c})^2}{(g*(L_o - L_c)*\rho)^2} + \left(\frac{uA_E}{A_E}\right)^2} \tag{40}$$

where $u(P_{io}-P_{ic})$ is absolute transfer uncertainty [Pa] of the difference between pressures $P_i$ ($P_1$ and $P_3$) at start (opening) and end (closing) of the transfer respectively. The absolute transfer uncertainty may be calculated as shown in equation (41):

$$u(P_{1o}-P_{1c}) = uP_{1lin}*P_{1range} = uP_{1lin}*g*\rho*(L_o-L_c) + P_{3range} [Pa] \tag{41}$$

The absolute transfer uncertainty [Pa] of the difference between pressures $P_3$ at start (opening) and end (closing) of the transfer respectively may be calculated as shown in equation (42):

$$u(P_{3o}-P_{3c}) = uP_{3lin}*P_{3range} [Pa] \tag{42}$$

where $L_o$ and $L_c$ are opening and closing levels respectively [m], $uA_E/A_E$ is relative uncertainty of the effective cross-sectional area of the tank derived from tank calibration, $P_{1range}$ is the difference in pressures between $P_1$ at opening and $P_1$ at the closing of the transfer and $P_{3range}$ is the difference in vapor pressure between $P_3$ at opening and closing of the transfer respectively. If $P_3$ is not measured, $P_{3range}$ is the difference between maximum (e.g., more than ambient pressure for a PV valve) and minimum (e.g., lower than ambient for a PV valve) vapor pressure [Pa]. $P_{1lin}$ and $P_{3lin}$ are as defined above.

In this example, the system with fully functional $P_3$ may meet the legal metrology requirements (uncertainty <0.5%) for transfers where the difference of the opening and closing levels are approximately 1 meter. When $P_3$ fails and the value of $P_3$ is inferred from $P_1$, the system may meet the same requirements down to the difference of opening and closing levels of approximately 3 meters.

For horizontal tanks; the transferred mass may be calculated as shown in equation (43):

$$M_x = \frac{A_{Eo} * P_{13o} - A_{Ec} * P_{13c}}{g} \text{ [kg]} \quad (43)$$

where areas $A_{Eo}$ (opening) and $A_{Ec}$ (closing) of transfer are both functions of level, which in turn is a function of $P_{13}$ and density ρ, $P_{13}$ is the value of differential pressure between the bottom and the top of the tank.

By neglecting the uncertainty of the gravity acceleration factor and thermal expansion, the uncertainty of transferred mass is may be calculated as shown in equation (44):

$$uM_x = \quad (44)$$

$$sqrt\left\{ \begin{array}{l} \left[\frac{uP_{13Z} * (F_{Qo} * A_{Eo} - F_{Qc} * A_{Ec}) + uP_{13lin} *}{(P_{13o} * F_{Qo} * A_{Eo} - P_{13c} * F_{Qc} * A_{Ec})}\right]^2 / g^2 + \\ \rho^2 * \left[ \begin{array}{l} (L_o * uA_{Eo})^2 + \\ (L_c * uA_{Ec})^2 \end{array}\right] + u\rho^2 * \left\{ \begin{array}{l} [V_o * (F_{Qo} - 1)]^2 + \\ [V_c * (F_{Qc} - 1)]^2 \end{array} \right\} \end{array} \right\} \text{[kg]}$$

where $L_o$, $L_c$ are levels at the start and end of transfer [m], $P_{13o}$, $P_{13c}$ are pressures $P_{13}$ at the start of and end of transfer respectively [Pa], $A_{Eo}$, $A_{Ec}$ are average cross-sectional areas of the tank at the start and end of transfer respectively [m²], $V_o$, $V_c$ are volumes at the start and end of transfer respectively [m³], $F_{Qo}$, $F_{Qc}$ are the tank geometry factors at levels $L_o$ and $L_c$ respectively, ρ is the liquid density measured independently [kg/m³], $uP_{13Z}$ is the zero offset components of uncertainties of pressure $P_{13}$[Pa], $uP_{13lin}$ is the linearity components of uncertainties of pressure $P_{13}$[Pa/Pa], $uA_{Eo}$, $uA_{Ec}$ are the uncertainties of the effective cross-sectional areas of the tank [m²], and uρ is the uncertainty of the liquid density [kg/m³].

A tank geometry factor may be used to calculate uncertainties of stored quantities in tanks of various shapes. The tank geometry factor may be defined as shown in equation (45):

$$F_Q = \frac{L}{V} * \frac{\partial V}{\partial L} = 1 + \frac{L}{A} * \frac{\partial A}{\partial L} \quad (45)$$

For vertical cylindrical tanks $F_Q$ may be equal to 1. Accordingly, the tank geometry factor may not appear in the equations.

For horizontal cylindrical tanks, the tank geometry factor may be defined as shown in equation (46):

$$F_Q = \frac{2 * \left(\frac{L}{D_i}\right)^2 * \sqrt{\frac{D_i}{L} - 1}}{0.25 * \arccos\left(1 - \frac{2*L}{D_i}\right) + \left(\frac{L}{D_i} - 0.5\right) * \sqrt{\frac{L}{D_i} - \left(\frac{L}{D_i}\right)^2}} \quad (46)$$

where $D_i$ is the internal diameter of the horizontal cylinder [m] and L is the liquid level to which the factor applies [m].

The techniques described above may be used to determine subsystem values and corresponding uncertainty data for horizontal and vertical tanks (620) and (630). Although detailed examples have been described, the techniques and calculations shown may be adapted and applied in other contexts and may be used to determine subsystem measurements and uncertainty data for other measurement values operating in normal or abnormal conditions.

The control device 550 accesses the horizontal tank 510 measurement and corresponding uncertainty data, the vertical tank 520 measurement and corresponding uncertainty data, and the flow meter 530 measurement and corresponding uncertainty data. For example, the system layer processing component 555 may access the horizontal tank 510 measurement and corresponding uncertainty data from the subsystem layer processing component 553 and may access the vertical tank 520 measurement and corresponding uncertainty data from the subsystem layer processing component 554. The system layer processing component 555 also may access the flow meter 530 measurement and corresponding uncertainty data directly from the flow meter 530. For instance, the system layer processing component 555 may access the flow meter 530 measurement and corresponding uncertainty data from a fieldbus. In some implementations, the flow meter 530 measurement and corresponding uncertainty data may be directly provided by sensors associated with the flow meter (e.g., first layer data). In other implementations, the flow meter 530 may determine a subsystem value and corresponding uncertainty for the flow meter 530 (e.g., second layer data) by analyzing its own sensor data.

The control device 550 determines operating conditions of the custody system based on the accessed data (650). For example, the system layer processing component 555 reconciles the measurement values accessed for the horizontal tank 510, the vertical tank 520, and the flow meter 530 to determine whether the measurements are consistent and detect errors in the operation of the system 500 in the event that discrepancies of the measurement values exist. The control device 550 (e.g., the system layer processing component 555) also may generate a system value and corresponding uncertainty data for the system value based on the measurement values accessed for the horizontal tank 510, the vertical tank 520, and the flow meter 530. The control device 550 may use techniques similar to those discussed above to combine the subsystem measurement values and produce a new system measurement value and corresponding uncertainty data.

The portion of the control device 550 making system layer computations (e.g., tank farm, custody transfer system) may use the validated date from the first layer and the second layer in order to determine (e.g., based on uncertainties) whether the data supplied to it from several sources (e.g., tank gauges, flow meter) is consistent. The portion of the control device 550 making system layer computations also may estimate probability of real differences in the data (e.g., presence of leaks/losses in either tank or in the pipes between them).

For instance, the control device 550 may determine transfer measurements using mass, volume, or reference volume. The reconciliation between the corresponding quantities (e.g., mass, volumes) may be made using data from a tank gauge on vertical tank 520, a tank gauge on horizontal tank 510, and the flow meter 530. The reconciled transferred quantity may be calculated as weighted average of the amount transferred from vertical tank 520, the amount transferred to the horizontal tank 510, and the amount transferred through the flow meter 530, where the individual weights are inversely proportional to the measurement uncertainties. The overall uncertainty of the weighted average may therefore be reduced. Moreover, if one of the instruments should either fail or exceed its desired uncertainty, the other instruments may supply measurements such that the weighted average remains within the desired limits.

In examples in which measurement errors are ignored, the measurement of transferred quantities from two tank gauges (e.g., one on each tank) and the flow meter are the same. In implementations in which measurement errors (e.g., uncertainties) are taken into account, the measurements may differ and each of measurement values may have a computed standard uncertainty.

The control device 550 for the tank farm system may calculate a table that includes the three values being compared (amount transferred from vertical tank 520, the amount transferred to the horizontal tank 510, and the amount transferred through the flow meter 530), each with its uncertainty; a best estimate of transferred quantity with its uncertainty calculated as weighted average of the three values; and an estimated presence and probable magnitude of a leak in the system.

For example, the reconciliation may yield the following results:

|  | from vertical tank | through flowmeter | into horizontal tank | reconciled quantity |
|---|---|---|---|---|
| Values: | 34.99 | 35.00 | 35.01 | 34.998 |
| Standard uncertainties: | 0.030 | 0.020 | 0.050 | 0.016 |

The above transferred quantities may be measured by a hydrostatic gauge on vertical tank 520, a part-hydrostatic gauge on horizontal tank 510, and the flow meter 530 (e.g., Coriolis-force flow meter).

The control device 550 also may detect leaks. In process industries, detection of leaks is an important function, perhaps more so with increasing awareness of environmental pollution, theft, etc. For instance, in custody transfer, one (or several) of the measured quantities may be different due to leak(s). These situations normally occur in either source or destination storage tank, or in the pipes between the tanks. The effects may be that quantity transferred out of one tank would not reach the other tank and/or the flow meter, or inventory in either tank would reduce without being registered by the flow meter or the gauge on the other tank.

Leaks may be of several types such as leak out of the system (e.g., to ground) and leak within the system (e.g., flow to another tank due to leaking valves). Although leaks out of the system may be detectable only under static conditions (e.g., no transfers), leaks within the system may show as differences between measured transferred quantities. Leaks may exist in the pipes on either side of the flow meter 530, or in the tanks 510 and 520. Leaks may manifest themselves as discrepancies between transferred quantities measured by the flow meter 530 and by either of the two tank gauges.

Thus, leaks may be detected by attempts to reconcile two or more measurements. In some systems, a leak may be detected if two (or more) measurements of the same quantity differ by more than a given limit, regardless of how uncertain the measurements might be. System 500, however, may base leak detection on uncertainties of individual measurements. Differences of the measured values may be combined with the uncertainties and the system may work out statistical properties of a potential leak (e.g., its magnitude versus probability). The user may then specify at what combination of magnitude and probability the user wishes to raise an alarm and initiate a maintenance action.

When reconciling the amount transferred from vertical tank 520, the amount transferred to the horizontal tank 510, and the amount transferred through the flow meter 530, a decision may be made as to whether the imbalance of their magnitudes indicates a leak. System 500 may allow such decisions to be based on measured "live" uncertainties and produce a function (e.g., a table) indicating probability of a leak of certain magnitude.

Specifically, two independent leaks may be computed as $\Delta TV_v$ for leaks on the vertical tank 520 (or from the pipes between it and the flow meter 530) and $\Delta TV_h$ for leaks on the horizontal tank 510 (or from the pipes between it and the flow meter 530). Leaks may be expressed in terms of the transferred variable ($TV_x$) that is currently used as the measure of transfer (e.g., volume, reference volume or mass).

Magnitudes of potential leaks may be defined as shown in equations (47) and (48):

$$\Delta TV_v = |TV_{xv} - TV_{xf}| \text{ on vertical tank} \quad (47)$$

$$\Delta TV_h = |TV_{xh} - TV_{xf}| \text{ on horizontal tank} \quad (48)$$

where $TV_{xv}$ equals quantity transferred in or out of the vertical tank 520 (may include leaks), $TV_{xh}$ equals quantity transferred in or out of the horizontal tank 510 (may include leaks), and $TV_{xf}$ equals quantity transferred through the flow meter 530.

Uncertainties of the above leaks may be computed as shown is equations (49) and (50):

$$u\Delta TV_v = \text{sqrt}\{uTV_{xv}^2 + uTV_{xf}^2\} \quad (49)$$

$$u\Delta TV_h = \text{sqrt}\{uTV_{xh}^2 + uTV_{xf}^2\} \quad (50)$$

Probability density of leaks may be calculated as a difference between the two measurements. From the probability distribution, probability may be calculated that the magnitude of leak is between two limits. For example, probability that the magnitude is between any two points on the scale may be calculated as shown in equation (51):

$$pTV = \frac{1}{\sigma * \sqrt{2\pi}} * \int_{\Delta TVmin}^{\Delta TVmax} \times e^{-\frac{(TV - TV_m)^2}{2\sigma^2}} * dTV \quad (51)$$

where $TV_m = \Delta TV_{max} - \Delta TV_{min}$ the absolute value of the leak and equals $\Delta TV_v$ or $\Delta TV_h$, TV is the general value of the leak, and $\sigma$ is the standard uncertainty (deviation) of the leak=$u\Delta TV_v$ or $u\Delta TV_h$.

Based on the same figures as above, probability of a leak between the vertical tank and the flowmeter is:

| | Average leak | | | | | | | | | |
|---|---|---|---|---|---|---|---|---|---|---|
| [kg]: | 0.000 | 0.005 | 0.010 | 0.015 | 0.020 | 0.025 | 0.030 | 0.035 | 0.040 | 0.045 |
| probability: | 10.6% | 11.2% | 11.3% | 10.9% | 10.6% | 10.1% | 9.5% | 8.7% | 7.8% | 6.9% | and probability of a leak between the horizontal tank and the flowmeter is:

| | Average leak | | | | | | | | | |
|---|---|---|---|---|---|---|---|---|---|---|
| [kg]: | 0.010 | 0.015 | 0.020 | 0.025 | 0.030 | 0.035 | 0.040 | 0.045 | 0.050 | 0.055 |
| probability: | 7.7% | 7.4% | 7.3% | 7.1% | 6.9% | 6.6% | 6.3% | 6.0% | 5.6% | 5.2% |

An estimate of measured transferred value $TV_x$ (e.g., volume, reference volume or mass) may be computed as shown by equation (52):

$$TV_{est} = \Sigma_i(w_i * TV_{xi}) \quad (52)$$

where i is the index indicating the sources of the transferred value, $w_i$ are weight factors that may be computed as shown in equation (53):

$$w_i = \frac{\left(\frac{1}{uTV_{xi}}\right)^2}{\sum_1^n \left(\frac{1}{uTV_{xi}}\right)^2} \quad (53)$$

where $uTV_{xi}$ are the uncertainties of individual measurements $TV_{xi}$, n is the total count of reconciled variables (e.g., n=3 in the case of two tanks and one flowmeter). Uncertainty of the estimated transferred value may be calculated as shown in equation (54):

$$uTV_{est} = \sqrt{\sum_1^n (w_i * uTV_{xi})^2} \quad (54)$$

Before calculating the estimate, the system may decide whether there is a leak and which of the measurements is affected by the leak. Reconciliation may be made from the measurements unaffected by the leak and the measurements affected by the leak may be discarded or given a lesser weight. The user may decide which of the values to declare as the transferred quantity. For instance, the user may declare transferred quantities as sent quantity, (e.g., of the liquid) that leaves the "source" tank reconciled with the flow meter. The user also may declare the transferred quantity as received quantity (of the liquid that arrives at the "destination" tank, short of the leaked quantity), both quantities, and a best estimate from all quantities unaffected by leaks (e.g., a weighted average).

Leaks from tanks/pipes under static conditions may not be measured by flow meters even if they go through them (e.g., near-zero flow, with zero cut-off). Any long-term decrease in tank inventory may not be "seen" by the flow meter 530.

The control device 550 also may determine availability of the system or system components. Availability may be expressed in terms of Mean Time Between Failures (MTBF). MTBF for system components may be supplied by manufacturers. In a non-validated system, the system MTBF may be calculated using $MTBF_{comp}$ of all system components. Any component failure may be assumed to result in the system failure. The MTBF of the system may be calculated as shown in equation (55):

$$\frac{1}{MTBF_{sys}} = \sum \left(\frac{1}{MTBF_{comp}}\right) \quad (55)$$

System 500 may always be available. Permanent availability, however, may be balanced against the system performance. In order to keep the system alive, either the required accuracy or available operating ranges may need to be degraded. Under normal operating conditions (e.g., no process aberrations, no faults), the system may remain available (e.g., for legal measurements) over ranges of operating and influencing conditions while the overall accuracy remains within limits required by the existing rules. Under fault conditions, the system may still exhibit tolerable accuracy, perhaps with reduction of ranges of operating and/or environmental conditions. Alternatively, the system may operate over the same ranges, but with decreased accuracy.

In some systems, (e.g., those for custody transfers) accuracy may be required to be maintained. In order to achieve this, the allowable ranges of operating and/or influencing variables may be reduced while still maintaining usefulness of the system for its purpose. As shown below, the system may still be able to operate with required accuracy even if some of its sensors are lost.

In system 500, the (raw) MTBF of the system may be modified using the knowledge of the system behavior. Adapted (e.g., qualified) MTBF may be used to express the prediction that the system would fulfill the performance requirements. Part of the expression of qualified MTBF may be the definition of ranges over which the system meets the requirements.

Defining system 500's availability in terms of failure rate/MTBF may not make much sense. It may be better to characterize system 500 in terms of reduced ranges of its input variables over which it remains fit for its purpose (e.g., custody transfer measurements) in presence of faults. For example, if 100% availability is defined as that of the system as designed (and approved), the reduced availability could be defined as shown in equation (56):

$$AS = A_{100} * R1red/R1 * R2red/R2 * \ldots * RNred/RN \quad (56)$$

where AS equals availability reduced in presence of device faults or process aberrations, $A_{100}$ equals 100% availability (of system with no device faults or process aberrations), R1, R2, ..., RN equal design ranges of input (operating or influencing) variables, and R1red, R2red ..., RNred equal reduced ranges of input (operating or influencing) variables.

System availability may provide a measure of degradation of the system and/or subsystem. The reduction of the range of a variable may relate to the weight given to the variable in calculation of uncertainty of the output. In this example, the magnitude of the reduction may therefore reflect the degree of seriousness of the fault/aberration.

System availability may be able to give fair indication of remaining usefulness of the system for its purpose. For a final decision on continuing use or on maintenance intervention, the details of the variable(s) that have reduced ranges may be contemplated (e.g., the liquid level, density, ambient temperature, etc.).

The control device 550 also may perform calculations related to mass balancing. Mass balancing is normally done in plants where materials are processed (e.g., chemical plants, oil refineries, etc.). A user may measure the mass of material coming in over a period of time, and reconcile it with the mass going out over the same period of time, mass used in the process over the same period of time, mass within the plant at the beginning of the period of time, and mass currently within the plant. Similar to leak detection, a limit may be set, above which the mass is declared out of balance, based on individual measurements, disregarding their uncertainties. System 500 may reconcile mass measurements based on their uncertainties, in a way similar to leak detection. System 500 may deliver a table (or a graph) of magnitudes of imbalances along with their probabilities. This may provide a tool for clear decision-making to the user.

The control device 550 controls operation of the custody transfer system based on the determined operating conditions (660). For example, the control device 550 sends control data to devices on the vertical tank 520 and the horizontal tank 510 based on the determined system properties in electronic communications over a wired or wireless communication pathway. The control data may instruct the devices of the vertical tank 520 and the horizontal tank 510 to adjust subsystem operating policies or the control data may provide specific instructions to the devices on the tanks to which the devices on these tanks respond. For instance, the control data may indicate that particular subsystems are to be turned off and certain subsystems are to be turned on. The subsystems may operate in accordance with the instructions allowing the control device 550 to control the system in an efficient manner.

The control device 550 also may display results of the process to a user or transmit the results to another person that may be interested in the results. In some implementations, the control device 550 is associated with a display device and enables users to perceive the operating conditions of the system by rendering a display of the operating conditions on the display device. The user perceiving the operating conditions may be able to provide user input to the control device 550 and control operation of the system based on the input. The control device 550 further may transmit operating condition information to other users over a wireless or wired connection. For example, the control device 550 may send an electronic mail message to a user indicating the operating conditions and providing a notification or alert to the user. The control device 550 may transmit operating condition information in other forms of communication (e.g., phone call, web page update, text messages, pager alerts, etc.). For instance, the control device 550 may detect a hazardous condition and send a pager alert to a person that maintains the system such that the person may handle the hazardous condition.

The techniques described above may provide for a number of advantages, particularly when applied to the custody transfer environment. For example, quality of many products depend on their composition. The relative quantities of individual components may be given by recipes and may be delivered by batching operations. The techniques described above may allow the individual quantities to be qualified by their uncertainties (e.g., by acceptable uncertainty limits) and overall quality control may be based on uncertainties of their measurements.

In safety-related systems, some measurements may be redundant so that even if one of them fails, the system may continue to operate until it is made safe. Instead of current majority voting schemes (e.g., two-of-three) and/or averaging the above techniques may estimate a reconciled measurement on the basis of uncertainties of individual measurements. This may yield better overall uncertainty if all measurements are available and "normal" uncertainty if at least one measurement remains CLEAR, while the system may be scheduled for maintenance if and when convenient.

Even in other systems, where redundancy is not a deliberate part of the design, measurements may be derived from more than one source. Although using alternative sources may result in larger uncertainties, the system may use them until the time when maintenance may be made without significant disruption.

Uncertainty of a measured quantity may be an important part of the measurement. Weights and Measures agencies normally approve equipment for custody transfer to have specified accuracy that must be met under all approved operating conditions for the system to remain "legal". The conditions may be restricted during the approval process such that the uncertainty is always guaranteed to be within the limit. In systems with multiple sources of data, these restrictions may assume that worst cases of errors happen simultaneously on all input variables. The system may be declared "not legal" if any input variable exceeds its prescribed limit. Additionally, in order to maintain the system in operational form, the user may be obliged to allow time-based inspections and frequent re-calibrations, whether these are required or not.

Measurements used for custody transfer of liquids may be subject to approvals by government agencies (e.g., measurement institutes). A state may impose taxes whenever bulk liquids (e.g., oil, oil products, chemicals, etc.) are bought and sold. In some cases, a tax also may be levied on inventories. Legal metrology systems may perform either static (e.g., tank gauges) or dynamic (e.g., flow meters) measurements, usually of either standard Volume or mass of the liquid. Transferred quantities may be the differences of two inventories (e.g., before and after transfer), or a total flow rate. The approval process may guarantee that during operation, the system will provide measurements with overall accuracy better than an agreed limit, such as 0.5% of reading.

The approvals may be based on laboratory tests of the sensors and examination of calculations performed by the system. Approval of the sensors usually results in limits imposed on specific operating conditions (e.g., ranges of liquid level, temperature, density, etc.), ambient conditions (e.g., temperature), etc. Any deviation from the imposed limits may put the system into a "not legal" state and prevent its use. Any fault in the sensors or in the system (e.g., calculations) may result in the system being likewise rendered "not legal". The system may require verification or re-calibration by the approval agency or its contractors, within a given time period (even if there is no indication of malfunction) of after a failure.

The above techniques may deliver the actual measurement uncertainty under all conceivable conditions. As such, a system may tolerate excursions outside the limits of one variable provided that other variables are within limits. The decisions on "legality" of the output variable may be based solely on the computed uncertainty under current conditions. A need to perform unnecessary inspections and time-based maintenance may not exist when using the techniques described above, as they may give an indication of when maintenance or re-calibration is likely to be required, e.g., by monitoring a "creep" of uncertainties. Further, any occurrence of aborted transfers (e.g., when the measurement becomes "not legal" during the transfer) may be less likely than in current systems.

Approvals of systems using the above techniques may involve additional verification of the validation mechanisms (e.g., calculations) for the normal and abnormal operating conditions as well as for fault conditions. However, as such systems may be designed to compute accuracy (e.g., uncertainties) of its outputs, a need to restrict their operating conditions based on individual variables may not exist. A requirement placed on a system using the above techniques may be directed to overall uncertainty (of the outputs). For example, overall uncertainty may be required to be less than a prescribed limit (e.g., 0.5% of reading). In this example, as long as this requirement is met, the system would be allowed to operate, even if some process aberrations and/or faults exist. Operation of such systems may save a great deal of unnecessary limitations, human interventions, and consequently expense.

A number of implementations have been described. Nevertheless, it will be understood that various modifications may be made. Accordingly, other implementations are within the scope of the following claims.

What is claimed is:

1. A method of determining operating conditions of an industrial process control system, the method comprising:
    receiving first sensor data generated by multiple sensors associated with a first subsystem included in an industrial process control system, the first sensor data including, from each of the multiple sensors associated with the first subsystem, a sensed value and uncertainty data associated with the sensed value;
    determining a first subsystem measurement based on the received first sensor data;
    determining first uncertainty data associated with the first subsystem measurement based on the received first sensor data;
    receiving second sensor data generated by multiple sensors associated with a second subsystem included in the industrial process control system, the second subsystem being different from the first subsystem and the second sensor data including, from each of the multiple sensors associated with the second subsystem, a sensed value and uncertainty data associated with the sensed value;
    determining a second subsystem measurement based on the received second sensor data;
    determining second uncertainty data associated with the second subsystem measurement based on the received second sensor data;
    accessing the first subsystem measurement, the first uncertainty data associated with the first subsystem measurement, the second subsystem measurement, and the second uncertainty data associated with the second subsystem measurement; and
    determining, using one or more processing devices, operating conditions of the industrial process control system based on the accessed first subsystem measurement, the accessed first uncertainty data associated with the first subsystem measurement, the accessed second subsystem measurement, and the accessed second uncertainty data associated with the second subsystem measurement,
    wherein determining, using one or more processing devices, operating conditions of the industrial process control system based on the accessed first subsystem measurement, the accessed first uncertainty data associated with the first subsystem measurement, the accessed second subsystem measurement, and the accessed second uncertainty data associated with the second subsystem measurement comprises detecting, using one or more processing devices, discrepancies between the accessed first subsystem measurement and the accessed second subsystem measurement.

2. The method of claim 1 wherein determining operating conditions of the industrial process control system based on the accessed first subsystem measurement, the accessed first uncertainty data associated with the first subsystem measurement, the accessed second subsystem measurement, and the accessed second uncertainty data associated with the second subsystem measurement comprises determining an availability measurement for the industrial process control system.

3. The method of claim 1 wherein determining operating conditions of the industrial process control system based on the accessed first subsystem measurement, the accessed first uncertainty data associated with the first subsystem measurement, the accessed second subsystem measurement, and the accessed second uncertainty data associated with the second subsystem measurement comprises determining a measurement value for the industrial process control system and corresponding uncertainty data for the measurement value for the industrial process control system, the uncertainty data for the measurement reflecting propagated uncertainty data associated with the multiple sensors associated with the first subsystem and the multiple sensors associated with the second subsystem.

4. The method of claim 1 wherein determining the first subsystem measurement based on the received first sensor data comprises:
    accessing model-based data representing a process performed by the first subsystem;
    accessing historical information associated with the process performed by the first subsystem; and
    determining the first subsystem measurement based on the model-based data and the historical information.

5. The method of claim 4 wherein determining the first subsystem measurement based on the model-based data and the historical information comprises:
    determining that at least one of the multiple sensors associated with the first subsystem is malfunctioning; and
    estimating a value for the at least one malfunctioning sensor based on the model-based data and the historical information; and
    determining the first subsystem measurement based on the estimated value for the at least one malfunctioning sensor.

6. An industrial process control system comprising:
    a first subsystem configured to perform a first portion of an industrial process, the first subsystem including multiple sensors;
    a second subsystem configured to perform a second portion of the industrial process, the second subsystem including multiple sensors, the second subsystem being different from the first subsystem, and the second portion of the industrial process being different than the first portion of the industrial process; and one or more processing devices configured to perform operations comprising:

receiving first sensor data generated by the multiple sensors associated with the first subsystem included in the industrial process control system, the first sensor data including, from each of the multiple sensors associated with the first subsystem, a sensed value and uncertainty data associated with the sensed value;

determining a first subsystem measurement based on the received first sensor data;

determining first uncertainty data associated with the first subsystem measurement based on the received first sensor data;

receiving second sensor data generated by the multiple sensors associated with the second subsystem included in the industrial process control system, the second sensor data including, from each of the multiple sensors associated with the second subsystem, a sensed value and uncertainty data associated with the sensed value;

determining a second subsystem measurement based on the received second sensor data;

determining second uncertainty data associated with the second subsystem measurement based on the received second sensor data;

accessing the first subsystem measurement, the first uncertainty data associated with the first subsystem measurement, the second subsystem measurement, and the second uncertainty data associated with the second subsystem measurement; and determining operating conditions of the industrial process control system based on the accessed first subsystem measurement, the accessed first uncertainty data associated with the first subsystem measurement, the accessed second subsystem measurement, and the accessed second uncertainty data associated with the second subsystem measurement, wherein determining operating conditions of the industrial process control system based on the accessed first subsystem measurement, the accessed first uncertainty data associated with the first subsystem measurement, the accessed second subsystem measurement, and the accessed second uncertainty data associated with the second subsystem measurement comprises detecting discrepancies between the accessed first subsystem measurement and the accessed second subsystem measurement.

7. A method of determining measurement values, the method comprising:

receiving, from a first sensor, a first sensed value corresponding to a first property of an industrial process;

receiving, from the first sensor, first uncertainty data associated with the first sensed value;

receiving, from a second sensor, a second sensed value corresponding to a second property of the industrial process, the second property of the industrial process being different than the first property of the industrial process;

receiving, from the second sensor, second uncertainty data associated with the second sensed value;

determining, for the industrial process and using one or more processing devices, a measurement and corresponding uncertainty data for the measurement based on the first sensed value, the first uncertainty data, the second sensed value, and the second uncertainty data, the measurement corresponding to a property of the industrial process that is different than at least one of the first property of the industrial process and the second property of the industrial process; and controlling operation of the industrial process based on the determined measurement and corresponding uncertainty data, wherein controlling operation of the industrial process based on the determined measurement and corresponding uncertainty data comprises, in the event of a fault condition, maintaining availability of the industrial process by reducing a required accuracy for a current operating range or reducing the current operating range.

8. The method of claim 7 wherein determining, for the industrial process, the measurement and corresponding uncertainty data for the measurement comprises determining, for the industrial process, a measurement that corresponds to a property of the industrial process that is different than both the first property of the industrial process and the second property of the industrial process.

9. The method of claim 7 wherein determining, for the industrial process, the measurement and corresponding uncertainty data for the measurement based on the first sensed value, the first uncertainty data, the second sensed value, and the second uncertainty data comprises:

accessing model-based data representing the industrial process for which the measurement is being determined; and computing the measurement and uncertainty data based on the accessed model-based data representing the industrial process for which the measurement is being determined.

10. The method of claim 9 wherein:

computing the measurement and uncertainty data based on the accessed model-based data representing the industrial process for which the measurement is being determined comprises computing the measurement by applying the first sensed value and second sensed value to a theoretical model representing the industrial process.

11. The method of claim 7 further comprising:

determining, based on the second sensed value and the second uncertainty data, that the second sensor is malfunctioning, wherein determining, for the industrial process, the measurement and corresponding uncertainty data for the measurement based on the first sensed value, the first uncertainty data, the second sensed value, and the second uncertainty data comprises:

accessing model-based data representing the industrial process for which the measurement is being determined, determining an estimated value for the second property based on the accessed model-based data;

determining uncertainty data associated with the estimated value for the second property based on the accessed model-based data; and determining, for the industrial process, the measurement and corresponding uncertainty data for the measurement based on the estimated value for the second property and the uncertainty data associated with the estimated value for the second property.

12. The method of claim 7 wherein determining, for the industrial process, the measurement and corresponding uncertainty data for the measurement based on the first sensed value, the first uncertainty data, the second sensed value, and the second uncertainty data comprises:
- accessing historical information associated with the industrial process for which the measurement is being determined; and
- determining, for the industrial process, the measurement and corresponding uncertainty data for the measurement based on the accessed historical information.

13. The method of claim 12 wherein accessing historical information associated with the industrial process for which the measurement is being determined comprises accessing data including past values sensed by the first sensor and the second sensor during operation of the industrial process.

14. The method of claim 12 further comprising:
- determining, based on the second sensed value and the second uncertainty data, that the second sensor is malfunctioning, wherein
- determining, for the industrial process, the measurement and corresponding uncertainty data for the measurement based on the accessed historical information comprises:
  - determining an estimated value for the second property based on the accessed historical information;
  - determining uncertainty data associated with the estimated value for the second property; and
  - determining, for the industrial process, the measurement and corresponding uncertainty data for the measurement based on the estimated value for the second property and the uncertainty data associated with the estimated value for the second property.

15. The method of claim 7 wherein:
- receiving, from the first sensor, first uncertainty data associated with the first sensed value comprises receiving data indicating an accuracy statistic associated with the first sensed value;
- receiving, from the second sensor, second uncertainty data associated with the second sensed value comprises receiving data indicating an accuracy statistic associated with the second sensed value; and
- determining, for the industrial process, a measurement and corresponding uncertainty data for the measurement based on the first sensed value, the first uncertainty data, the second sensed value, and the second uncertainty data comprises determining a measurement and corresponding accuracy statistic for the measurement.

16. The method of claim 7 wherein:
- receiving, from the first sensor, first uncertainty data associated with the first sensed value comprises receiving data indicating an operating status of the first sensor;
- receiving, from the second sensor, second uncertainty data associated with the second sensed value comprises receiving data indicating an operating status of the second sensor; and
- determining, for the industrial process, a measurement and corresponding uncertainty data for the measurement based on the first sensed value, the first uncertainty data, the second sensed value, and the second uncertainty data comprises determining a measurement and corresponding data indicating an operating status of the resulting measurement of the industrial process.

17. The method of claim 16 wherein:
- receiving data indicating an operating status of the first sensor comprises receiving data indicating whether the first sensor is operating correctly, is partially operating correctly, or is not operating correctly;
- receiving data indicating an operating status of the second sensor comprises receiving data indicating whether the second sensor is operating correctly, is partially operating correctly, or is not operating correctly;
- determining a measurement and corresponding data indicating an operating status of the industrial process comprises determining whether the resulting measurement of the industrial process is operating correctly, is partially operating correctly, or is not operating correctly based on the data indicating whether the first sensor is operating correctly, is partially operating correctly, or is not operating correctly and the data indicating whether the second sensor is operating correctly, is partially operating correctly, or is not operating correctly.

18. The method of claim 7 further comprising:
- accessing model-based data representing the industrial process;
- accessing historical information associated with the industrial process; and
- validating the first sensed value and the second sensed value based on the accessed model-based data and the accessed historical information.

19. The method of claim 7 wherein:
- receiving, from the first sensor, the first sensed value corresponding to the first property of the industrial process comprises receiving, from one of a temperature sensor, a pressure sensor, a level sensor, or a flow meter, a sensed value corresponding to one of a temperature, a pressure, a level, or a totalized flow quantity of liquid in a custody transfer process; and
- receiving, from the second sensor, the second sensed value corresponding to the second property of the industrial process comprises receiving, from one of a temperature sensor, a pressure sensor, a level sensor, or a flow meter, a sensed value corresponding to one of a temperature, a pressure, a level, or a totalized flow quantity of liquid in the custody transfer process.

20. A method of determining measurement values, the method comprising:
- receiving, from a first sensor, a first sensed value corresponding to a first property of an industrial process;
- receiving, from the first sensor, first data indicating an accuracy statistic associated with the first sensed value;
- receiving, from a second sensor, a second sensed value corresponding to a second property of the industrial process, the second property of the industrial process being different than the first property of the industrial process;
- receiving, from the second sensor, second data indicating an accuracy statistic associated with the second sensed value; and
- determining, for the industrial process and using one or more processing devices, a measurement and corresponding accuracy statistic for the measurement based on the first sensed value, the first data, the second sensed value, and the second data, the measurement corresponding to a property of the industrial process that is different than at least one of the first property of the industrial process and the second property of the industrial process,
- wherein the first sensed value corresponding to the first property of the industrial process is related to the second sensed value corresponding to the second property of the industrial process; and
- wherein determining a measurement and corresponding accuracy statistic for the measurement comprises determining an accuracy statistic for the measurement indicating that the measurement is more accurate than the first sensed value and the second sensed value.

21. A method of determining measurement values, the method comprising:

receiving, from a first sensor, a first sensed value corresponding to a first property of an industrial process;

receiving, from the first sensor, first data indicating an accuracy statistic associated with the first sensed value;

receiving, from a second sensor, a second sensed value corresponding to a second property of the industrial process, the second property of the industrial process being different than the first property of the industrial process;

receiving, from the second sensor, second data indicating an accuracy statistic associated with the second sensed value; and determining, for the industrial process and using one or more processing devices, a measurement and corresponding accuracy statistic for the measurement based on the first sensed value, the first data, the second sensed value, and the second data, the measurement corresponding to a property of the industrial process that is different than at least one of the first property of the industrial process and the second property of the industrial process, wherein determining a measurement and corresponding accuracy statistic for the measurement comprises:

accessing model-based data representing the industrial process for which the measurement is being determined;

adjusting the accuracy statistic associated with the first sensed value based on the model-based data;

adjusting the accuracy statistic associated with the second sensed value based on the model-based data;

determining an accuracy statistic for the measurement based on the adjusted accuracy statistic associated with the first sensed value and the adjusted accuracy statistic associated with the second sensed value.

22. The method of claim 21 wherein adjusting the accuracy statistic associated with the first sensed value based on the model-based data comprises:

determining a value for at least one property that influences the accuracy of the first sensor; and adjusting the accuracy statistic associated with the first sensed value based on the value for at least one property that influences the accuracy of the first sensor and the model-based data.

23. A system for determining measurement values, the system comprising:

a first sensor configured to sense a first property of an industrial process;

a second sensor configured to sense a second property of the industrial process, the second property of the industrial process being different than the first property of the industrial process; and one or more processing devices configured to perform operations comprising:

receiving, from a first sensor, a first sensed value corresponding to a first property of an industrial process;

receiving, from the first sensor, first uncertainty data associated with the first sensed value;

receiving, from a second sensor, a second sensed value corresponding to a second property of the industrial process, the second property of the industrial process being different than the first property of the industrial process;

receiving, from the second sensor, second uncertainty data associated with the second sensed value;

determining, for the industrial process, a measurement and corresponding uncertainty data for the measurement based on the first sensed value, the first uncertainty data, the second sensed value, and the second uncertainty data, the measurement corresponding to a property of the industrial process that is different than at least one of the first property of the industrial process and the second property of the industrial process; and controlling operation of the industrial process based on the determined measurement and corresponding uncertainty data, wherein controlling operation of the industrial process based on the determined measurement and corresponding uncertainty data comprises, in the event of a fault condition, maintaining availability of the industrial process by reducing a required accuracy for a current operating range or reducing the current operating range.

24. A system for determining measurement values, the system comprising:

a first sensor configured to sense a first property of an industrial process;

a second sensor configured to sense a second property of the industrial process, the second property of the industrial process being different than the first property of the industrial process; and one or more processing devices configured to perform operations comprising:

receiving, from a first sensor, a first sensed value corresponding to a first property of an industrial process;

receiving, from the first sensor, first data indicating an accuracy statistic associated with the first sensed value;

receiving, from a second sensor, a second sensed value corresponding to a second property of the industrial process, the second property of the industrial process being different than the first property of the industrial process;

receiving, from the second sensor, second data indicating an accuracy statistic associated with the second sensed value; and determining, for the industrial process, a measurement and corresponding accuracy statistic for the measurement based on the first sensed value, the first data, the second sensed value, and the second data, the measurement corresponding to a property of the industrial process that is different than at least one of the first property of the industrial process and the second property of the industrial process, wherein the first sensed value corresponding to the first property of the industrial process is related to the second sensed value corresponding to the second property of the industrial process; and wherein determining a measurement and corresponding accuracy statistic for the measurement comprises determining an accuracy statistic for the measurement indicating that the measurement is more accurate than the first sensed value and the second sensed value.

25. A system for determining measurement values, the system comprising:

a first sensor configured to sense a first property of an industrial process;

a second sensor configured to sense a second property of the industrial process, the second property of the industrial process being different than the first property of the industrial process; and one or more processing devices configured to perform operations comprising:
- receiving, from a first sensor, a first sensed value corresponding to a first property of an industrial process;
- receiving, from the first sensor, first data indicating an accuracy statistic associated with the first sensed value;
- receiving, from a second sensor, a second sensed value corresponding to a second property of the industrial process, the second property of the industrial process being different than the first property of the industrial process;
- receiving, from the second sensor, second data indicating an accuracy statistic associated with the second sensed value; and
- determining, for the industrial process, a measurement and corresponding accuracy statistic for the measurement based on the first sensed value, the first data, the second sensed value, and the second data, the measurement corresponding to a property of the industrial process that is different than at least one of the first property of the industrial process and the second property of the industrial process,
- wherein determining a measurement and corresponding accuracy statistic for the measurement comprises:
  - accessing model-based data representing the industrial process for which the measurement is being determined;
  - adjusting the accuracy statistic associated with the first sensed value based on the model-based data;
  - adjusting the accuracy statistic associated with the second sensed value based on the model-based data;
  - determining an accuracy statistic for the measurement based on the adjusted accuracy statistic associated with the first sensed value and the adjusted accuracy statistic associated with the second sensed value.

26. The system of claim 25 wherein adjusting the accuracy statistic associated with the first sensed value based on the model-based data comprises:
- determining a value for at least one property that influences the accuracy of the first sensor; and
- adjusting the accuracy statistic associated with the first sensed value based on the value for at least one property that influences the accuracy of the first sensor and the model-based data.

* * * * *